United States Patent
Van Uum et al.

(10) Patent No.: US 8,534,968 B2
(45) Date of Patent: Sep. 17, 2013

(54) RAILCAR DISTRIBUTION SYSTEM AND METHOD FOR SHIPPING PRODUCT

(75) Inventors: Sean T. Van Uum, Cumming, GA (US); Robert P. Hieronymus, Marietta, GA (US)

(73) Assignee: Georgia-Pacific Consumer Products LP, Atlanta, GA (US)

(*) Notice: Subject to any disclaimer, the term of this patent is extended or adjusted under 35 U.S.C. 154(b) by 386 days.

(21) Appl. No.: 12/608,163

(22) Filed: Oct. 29, 2009

(65) Prior Publication Data

US 2010/0092268 A1   Apr. 15, 2010

Related U.S. Application Data

(60) Provisional application No. 61/237,188, filed on Aug. 26, 2009, provisional application No. 61/222,660, filed on Jul. 2, 2009, provisional application No. 61/184,555, filed on Jun. 5, 2009.

(51) Int. Cl.
*B60P 7/08* (2006.01)

(52) U.S. Cl.
USPC .................. 410/32; 410/31; 410/46

(58) Field of Classification Search
USPC ......... 410/31, 32, 35, 46, 154, 155; 105/355; 220/1.5
See application file for complete search history.

(56) References Cited

U.S. PATENT DOCUMENTS

| | | | |
|---|---|---|---|
| 3,055,573 A | 9/1962 | Carter | |
| 3,985,242 A * | 10/1976 | Schlaeger | 410/121 |
| 3,986,611 A | 10/1976 | Dreher | |
| 4,036,364 A | 7/1977 | Ambrose et al. | |
| 4,068,765 A | 1/1978 | Pulda | |
| 4,201,138 A | 5/1980 | Cox | |
| 4,292,901 A | 10/1981 | Cox | |
| 4,365,710 A | 12/1982 | Swanson | |
| 4,793,490 A | 12/1988 | Evert | |
| 4,852,330 A | 8/1989 | Carangelo | |
| 4,913,290 A | 4/1990 | deGroot | |
| 5,255,841 A | 10/1993 | Ritter | |
| 5,370,233 A | 12/1994 | Schutz et al. | |
| D359,180 S | 6/1995 | Bedney | |

(Continued)

FOREIGN PATENT DOCUMENTS

| DE | 10141964 A1 | 3/2003 |
|---|---|---|
| EP | 0799780 A2 | 10/1997 |

(Continued)

OTHER PUBLICATIONS

Office Action for U.S. Appl. No. 12/603,998 mailed Jul. 9, 2010.

(Continued)

*Primary Examiner* — Stephen Gordon
(74) *Attorney, Agent, or Firm* — William W. Letson

(57) ABSTRACT

A distribution system includes a railcar having a length defining an x-direction, and a payload disposed within the interior of the railcar. The payload includes assemblages of product, the product of each assemblage being disposed upon a pallet, the assemblages being arranged in sets of assemblages along the x-direction. The sets of assemblages are disposed in an alternating staggered arrangement in the x-direction such that a first plurality of the sets of assemblages are disposed substantially toward one side of the railcar, and a second plurality of the sets of assemblages are disposed substantially toward the other side of the railcar.

13 Claims, 16 Drawing Sheets

(56) References Cited

U.S. PATENT DOCUMENTS

| | | | |
|---|---|---|---|
| 5,630,692 | A | 5/1997 | Hanaya |
| 5,647,191 | A | 7/1997 | Villemure |
| 5,725,089 | A | 3/1998 | Ravet et al. |
| 5,749,693 | A | 5/1998 | Hanaya |
| 5,844,807 | A | 12/1998 | Anderson et al. |
| 5,992,735 | A | 11/1999 | Oosterbaan |
| 6,041,570 | A | 3/2000 | Descalzo |
| 6,386,824 | B1 | 5/2002 | Pizzi et al. |
| 6,419,090 | B1 | 7/2002 | Focke et al. |
| D479,062 | S | 9/2003 | Meyer |
| 7,411,602 | B2 | 8/2008 | Stenzel et al. |
| 7,854,577 | B2 * | 12/2010 | Green ............................ 410/32 |
| 7,880,907 | B2 | 2/2011 | Sugimoto |
| 2003/0150764 | A1 | 8/2003 | Bevier |
| 2004/0051328 | A1 | 3/2004 | Cinotti et al. |
| 2004/0124111 | A1 | 7/2004 | Bevier |
| 2005/0224731 | A1 | 10/2005 | Hahn et al. |
| 2006/0249565 | A1 | 11/2006 | Wood et al. |
| 2006/0272961 | A1 | 12/2006 | Justice et al. |
| 2009/0162181 | A1 | 6/2009 | Ryf |
| 2009/0288980 | A1 | 11/2009 | Hadala |
| 2010/0089781 | A1 | 4/2010 | Van Uum et al. |
| 2010/0307943 | A1 | 12/2010 | Hieronymus et al. |

FOREIGN PATENT DOCUMENTS

| | | |
|---|---|---|
| EP | 0896945 A2 | 2/1999 |
| JP | 3111213 A | 5/1991 |
| JP | 6135511 A | 5/1994 |
| JP | 2008189369 A | 8/2008 |

OTHER PUBLICATIONS

Final Office Action for U.S. Appl. No. 12/603,998 mailed Mar. 28, 2011.

Office Action for U.S. Appl. No. 12/604,021 mailed Nov. 9, 2011.

English Translation for JP3111213 (A); Publication Date: May 13, 1991; Title: "Method for Packing Planographic Ream"; Applicant: Sanyo Kokusaku Pulp Co.; One page.

English Translation for JP6135511 (A); Publication Date: May 17, 1994; Title: "Automatic Picking Method and Device for Stacked Sheet-Like Packing Body"; Applicant: Tokushu Seishi KK; One page.

English Translation for JP2008189369 (A); Publication Date: Aug. 21, 2008; Title: "Transporting and Displaying Method of Paper Product"; Applicant: Nippon Paper Crecia Co. Ltd.; One page.

English Translation for EP0799780 (A2); Publication Date: Oct. 8, 1997; Title: "Palletizing Device for Reams of Paper"; Applicant: E.C.H. Will GMBH & Co. [DE]; One page.

English Translation for EP0896945 (A2); Publication Date: Feb. 17, 1999; Title: "Device and Method for Stacking Batches of Paper"; Applicant: Bielomatik Leuze & Co. [DE]; One page.

English Translation for DE10141964 (A1); Publication Date: Mar. 20, 2003; Title: "Method for Forming Stacks From Reams of Paper on Pallet Comprises Feeding Them From Conveyor Belt of Adjustable Height, Bridge Being Placed Over Nearer Stack, Allowing Stacking in Further Position"; Applicant: Bielomatik Lueuze & Co. [DE]; One page.

* cited by examiner

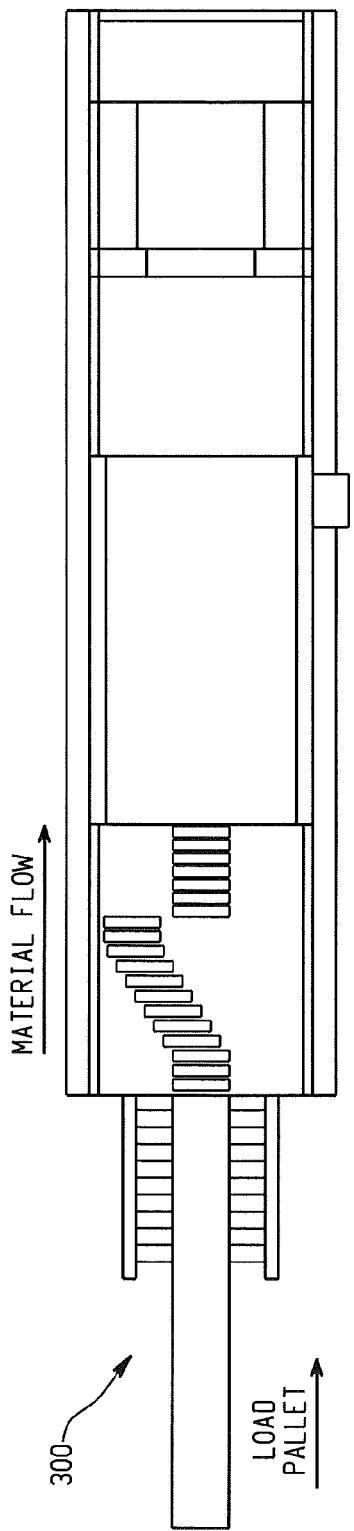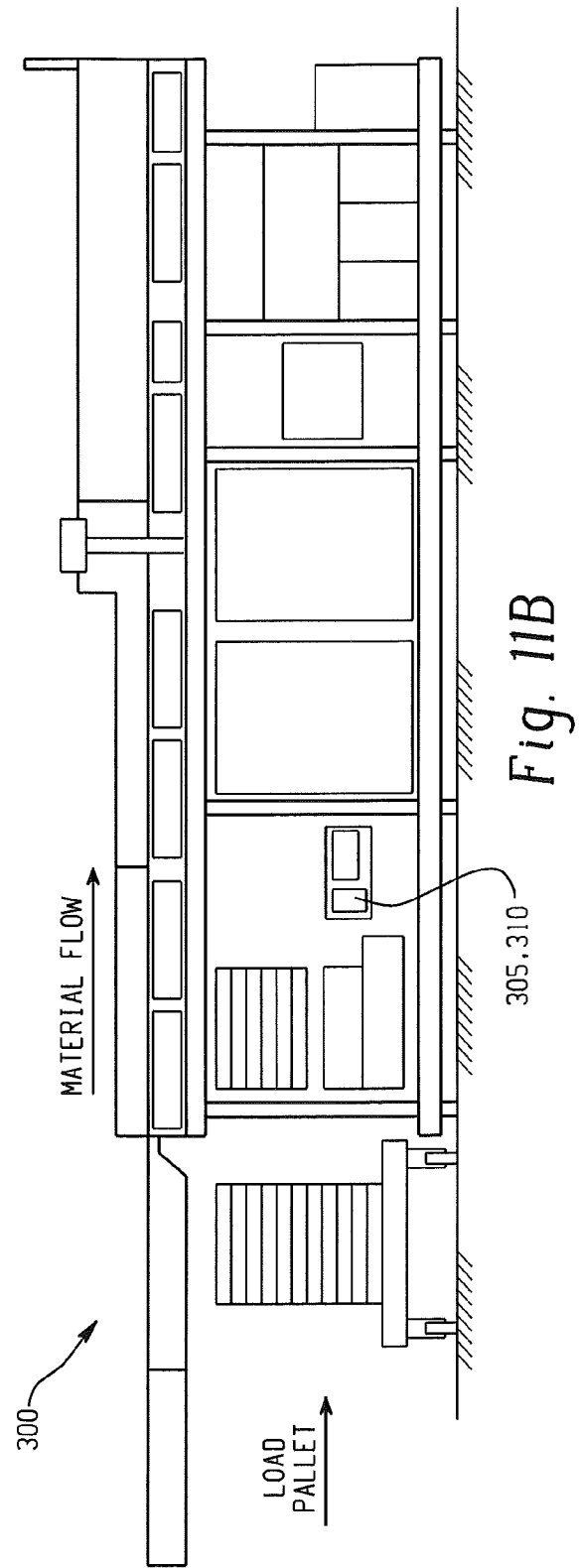

RAILCAR DISTRIBUTION SYSTEM AND METHOD FOR SHIPPING PRODUCT

CROSS REFERENCE TO RELATED APPLICATIONS

This application claims the benefit of U.S. Provisional Application Ser. No. 61/237,188, filed 26 Aug. 2009, which is incorporated herein by reference in its entirety. This application also claims the benefit of U.S. Provisional Application Ser. No. 61/222,660, filed 2 Jul. 2009, which is incorporated herein by reference in its entirety. This application further claims the benefit of U.S. Provisional Application Ser. No. 61/184,555, filed 5 Jun. 2009, which is incorporated herein by reference in its entirety.

BACKGROUND OF THE INVENTION

The present disclosure relates generally to a railcar distribution system and method for shipping product, and particularly to a distribution system including a railcar with a payload disposed and particularly arranged therein and a method of disposing and arranging the payload. The present disclosure also relates generally to an assemblage of containers, particularly to an assemblage of containers containing reams of paper and supported by a shipping pallet, and more particularly to a railcar distribution system for distribution of the assemblage of containers supported by the shipping pallet. The present disclosure further relates generally to an assemblage of and method of assembling reams of paper, particularly to an assemblage of and method of assembling reams of paper on a pallet, and more particularly to a railcar distribution system for distribution of the assemblage of reams of paper on the pallet.

High volume transportation of product such as communications papers over land may be accomplished by way of tractor trailer or railcar for example, with a railcar distribution system being most beneficial due to economies of scale. However, the dynamics of a railcar in transit presents a unique set of problems, such as sway and rocking of the railcar and payload as the railcar travels over the rails. To remedy possible shifts in a payload, railcars today are packed with dunnage to secure the payload against an interior surface of the railcar. Without this dunnage, shifting of the payload could possibly change the center of gravity of the railcar during transit, which could make the railcar unstable. Another transportation issue that arises with existing payloads in railcars relates to the degree of underhang of the assemblage of product stacked on a shipping pallet. The more the underhang, the more the likelihood of product shifting during transit. To remedy this situation, dunnage may be used when stacking and wrapping the assemblage of product on each pallet. With both of the above noted scenarios, dunnage is used, which is suitable for its intended purposes, but adds undesirable waste and cost, which is calculated not only by the weight of dunnage used, but also by the cost of producing the dunnage and then disposing of it when the product arrives at its desired destination.

Regarding the assemblage of containers for distribution by railcar, historically the communications papers industry has used 47-inch×35½-inch (47×35½) block or stringer pallets as the primary shipping platforms for cut-size paper. The most common packaging configuration used by the paper industry is the 8.5"×11" sheet size with 500 sheets per ream and 10 reams per carton with the reams configured in two 5-ream stacks side by side. The block or stringer pallet size accommodates an 8-carton layer footprint for product that fit almost perfectly to the pallet area dimensions with minimal under-hang or over-hang of the cartons relative to the pallet. The stability of the perfect cube of product on the pallet allows the 40 carton pallet configuration (5 layers of the 8 carton footprint) to be safely stacked 3 or 4 pallets high in warehouses and easily accommodated shipment in truck and rail cars with minimal load shifting and minimal bracing to prevent product damage during transit. Over the past 20 years as cut size paper sales migrated into retail distribution channels, these customers required the use of a different pallet size, the 48-inch×40-inch GMA (Grocery Manufacturers of America) design to fit in the standard rack stacking systems routinely used for storage of all products in this industry. For operational ease, in the paper industry the same identical standard carton footprints patterns used on the block and stringer pallets were simply transferred and used routinely on the GMA pallet. In the case of the most common product packaging configuration of cut size product (the 8.5"×11", 10 ream carton), the standard 8-case layer pallet pattern configuration has usually been adopted. Because this pallet size is now larger than the footprint of the traditional 8-case layer pattern, it creates an under-hang situation of carton footprint relative to the pallet. When attempting to stack the pallets in storage without racks, the upper pallets are no longer supported to the edge of the pallet by the cartons in the lower pallet cube units, creating a less stable stacking unit. Also, during shipment the under-hang of the product on the pallet increases the opportunity for the product damage to occur due to carton shifting in the space that now exists between the carton unit blocks on the pallet, even when the pallets are touching in the load pattern.

To compensate for stacking instability and product damage, material handlers typically limit the heights at which the unit loads are stored to three unit loads per stack. However, in most cases the third unit load is pyramided, that is, it is positioned such that it straddles two side-by-side unit loads. By pyramiding, material handlers are able to store unit loads three high, but they lose ⅓ of a floor spot for every pyramided unit.

Also, to gain storage density and to make pyramiding more practical, material handlers must concentrate like SKUs in one area. This affects operational efficiency in that block storage limits the material handlers' ability to slot SKUs according to the velocity at which they flow in and out of the warehouse. This leads to longer travel distances, which in turn, adds cost by reducing efficiency and increasing truck maintenance and fuel costs.

Regarding distribution by railcar using pallets, wooden pallets are highly utilized for transporting many types of product, which may then be stored at the receiving site for future processing, unloaded at the receiving site for display and/or storage in an alternative manner, or placed on a suitable shelf as-received for end-user viewing and purchase. With respect to transportation from the point-of-production to the point-of-sale of paper product useful for photocopying, printing, or the like, the paper is typically stacked in reams that are individually wrapped in a suitable film material that envelopes each ream, and then placed in suitably sized cardboard boxes for loading on a pallet via an automated palletizer. The cardboard boxes provide protection for the reams of paper during transportation and also provide increased rigidity to the stacked arrangement on a pallet. For 8.5-inch by 11-inch paper stacked in a cardboard box, a double stacked carton of reams has a footprint dimension of about 17.75-inches by 11.75-inches, which must then be placed on an industry standard shipping pallet, such as a GMA (Grocery Manufacturers of America) pallet having nominal dimensions of 40-inches by 48-inches. Due to the rigidity provided by the cardboard boxes, the boxed reams of paper are generally stacked in column form, which is suitable for some forms of transportation. The cardboard boxes, however, are typically only used for shipping and are generally discarded at the receiving site, and the extra thickness of the cardboard boxes adds to the overall size of the reams of paper that are to be palletized. As such, the cardboard boxes are seen to add waste to the shipping process and to interfere in optimizing the packing of a plurality of layers of reams of paper on an industry standard sized pallet. On the other hand, transporting a plurality of layers of reams of paper absent cardboard boxes may yield unstable pallets that are unsuitable for long-distance transportation. Accordingly, there is a need in the art for palletizing a plurality of layers of reams of paper in a more ecologically friendly manner that is also suitable for stable long distance transportation.

In view of the forgoing, it would be desirable to provide improvements in the art of product transportation and distribution that is more economical and offers a "green" solution to the use of dunnage.

This background information is provided to reveal information believed by the applicant to be of possible relevance to the present invention. No admission is necessarily intended, nor should be construed, that any of the preceding information constitutes prior art against the present invention.

BRIEF DESCRIPTION OF THE INVENTION

An embodiment of the invention includes a distribution system including a railcar having a length defining an x-direction, and a payload disposed within the interior of the railcar. The payload includes assemblages of product, the product of each assemblage being disposed upon a pallet, the assemblages being arranged in sets of assemblages along the x-direction. The sets of assemblages are disposed in an alternating staggered arrangement in the x-direction such that a first plurality of the sets of assemblages are disposed substantially toward one side of the railcar, and a second plurality of the sets of assemblages are disposed substantially toward the other side of the railcar.

An embodiment of the invention also includes a method of distributing product, by providing a railcar having a length defining an x-direction, and disposing within the railcar a payload, wherein the payload includes assemblages of product, the product of each assemblage being disposed upon a pallet, the assemblages being arranged in sets of assemblages along the x-direction, and wherein the sets of assemblages are disposed in an alternating staggered arrangement in the x-direction such that a first plurality of the sets of assemblages are disposed substantially toward one side of the railcar, and a second plurality of the sets of assemblages are disposed substantially toward the other side of the railcar.

BRIEF DESCRIPTION OF THE DRAWINGS

Referring to the exemplary drawings wherein like elements are numbered alike in the accompanying Figures:

FIGS. 11A and 11B depict a top view and a side view in schematic block diagram form of an example palletizer useful for practicing a method of assembling product on a pallet for use in accordance with an embodiment of the invention;

DETAILED DESCRIPTION OF THE INVENTION

Although the following detailed description contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention.

Figure 1:
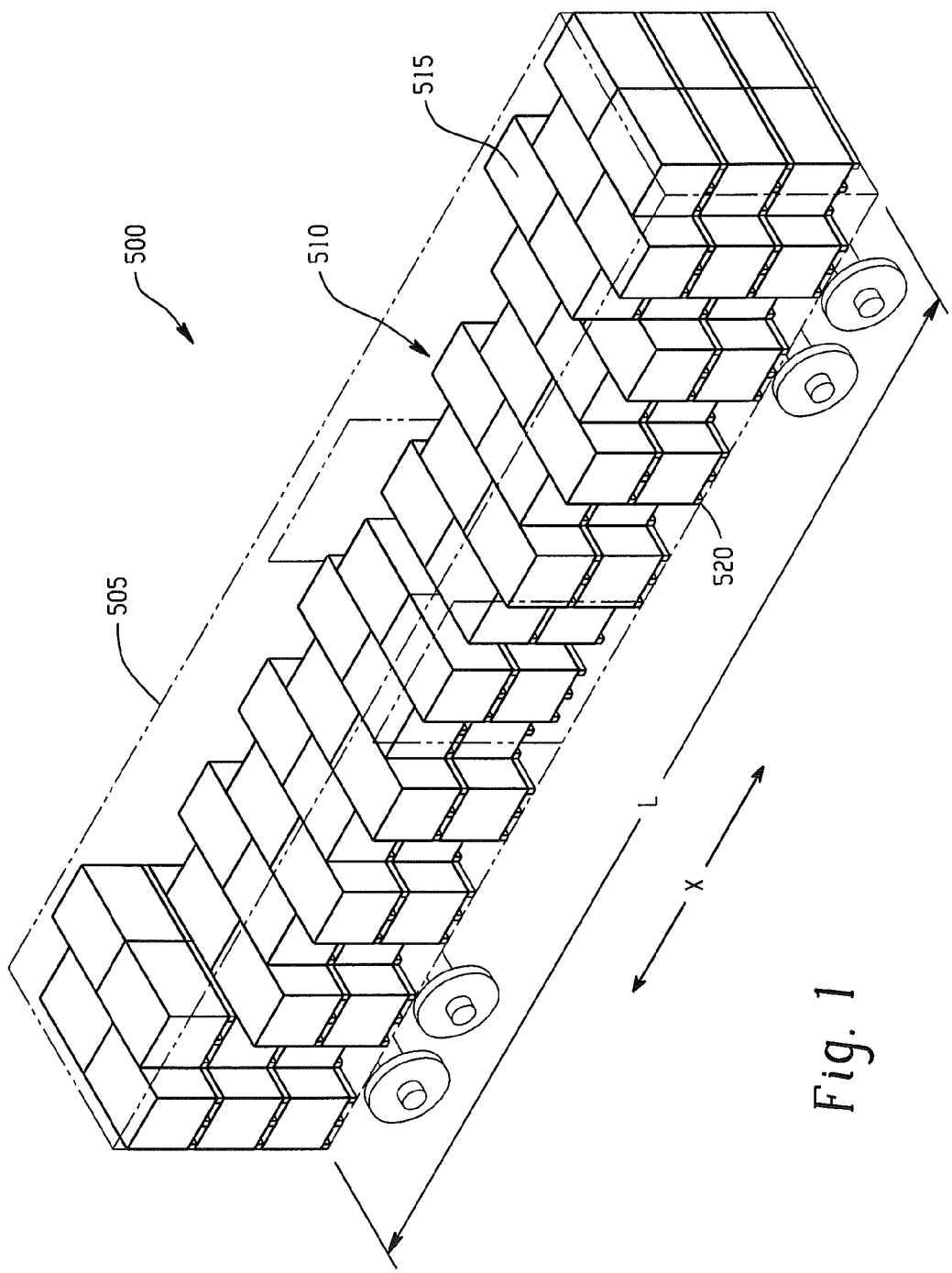
FIG. 1 depicts in isometric view a distribution system in accordance with an embodiment of the invention.
Figure 2:
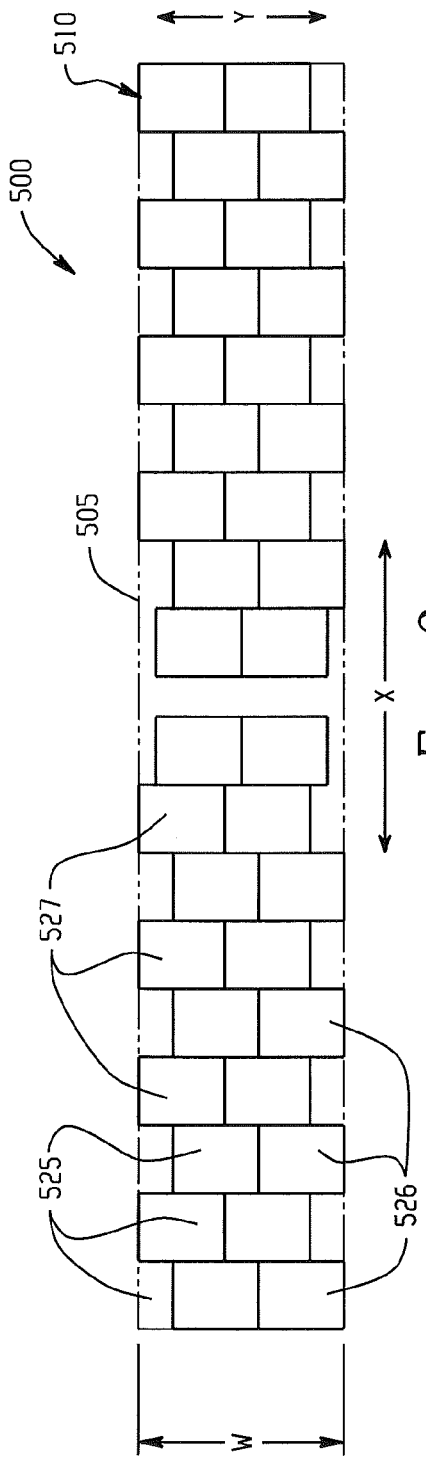
FIG. 2 depicts a top view of the distribution system of FIG. 1.

An embodiment of the invention, as shown and described by the various figures and accompanying text, provides a distribution system 500 having a railcar 505 having a length L defining an x-direction, and a payload 510 disposed within the interior of the railcar 505. The payload 510 includes assemblages of product 515, the product of each assemblage 515 being disposed upon a pallet 520, the assemblages 515 being arranged in sets 525 of assemblages along the x-direction (see FIG. 2). With reference now to FIG. 2, the sets 525 of assemblages are disposed in an alternating staggered arrangement in the x-direction such that a first plurality of the sets 526 of assemblages are disposed substantially toward one side of the railcar 505, and a second plurality of the sets 527 of assemblages are disposed substantially toward the other side of the railcar 505. While reference numerals 525, 526, 527 refer to only three features each in FIG. 2, it will be appreciated that like features illustrated may also be referred to by reference numerals 525, 526, 527. By staggering the payload as herein illustrated and described, the payload 510 is so disposed and arranged so as to substantially eliminate sway and rocking of the payload 510 and railcar 505 while in transit as compared to a substantially similar payload disposed in a substantially similar railcar absent side dunnage (not illustrated but discussed above) and disposed in a substantially linear arrangement (i.e., not staggered) in the x-direction. As illustrated in FIG. 2, the alternating staggered arrangement of sets 526, 527 is such that every other set of assemblages is disposed toward a same side of the railcar 505. However, it will be appreciated that the scope of the invention is not so limited and also encompasses other arrangements so covered by the claims appended hereto.

Figure 3:
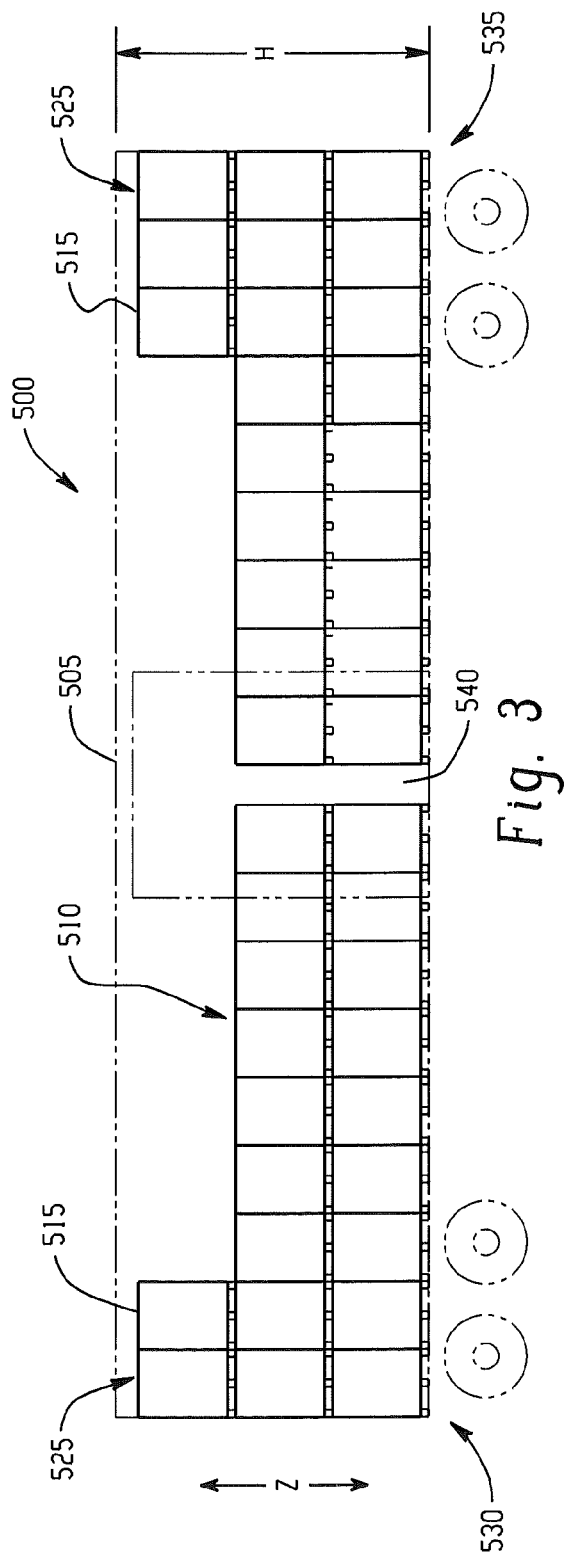
FIG. 3 depicts a side view of the distribution system of FIG. 1.

With reference now to FIG. 3, the railcar 505 has a height H defining a z-direction, where in an embodiment a set 525 of assemblages disposed at a first end 530 of the railcar 505 and a set 525 of assemblages disposed at a second opposite end 535 of the railcar 505 each have one more assemblage 515 of product stacked in the z-direction as compared to a set 525 of assemblages disposed toward the central x/2 location 540 of the railcar 505.

In another embodiment, two adjacent sets 525 of assemblages disposed at the first end 530 of the railcar 505 and two adjacent sets 525 of assemblages disposed at the second opposite end 535 of the railcar 505 each have one more assemblage 515 of product stacked in the z-direction as compared to a set 525 of assemblages disposed toward the central x/2 location 540 of the railcar 505.

In another embodiment, two adjacent sets 525 of assemblages disposed at the first end 530 of the railcar 505 and three adjacent sets 525 of assemblages disposed at the second opposite end 535 of the railcar 505 each have one more assemblage 515 of product stacked in the z-direction as compared to a set 525 of assemblages disposed toward the central x/2 location 540 of the railcar 505, as depicted in FIG. 3.

In another embodiment, at least a first set of assemblages disposed at the first end 530 of the railcar 505 and a second set of assemblages disposed at the second opposite end 535 of the railcar 505 each have three layers of assemblages 515 stacked in the z-direction, and the remaining sets of assemblages have two layers of assemblages 515 stacked in the z-direction, as depicted in FIG. 3.

By strategically stacking the ends of the railcar 505 as disclosed herein, the height of the center of gravity of the railcar 505 can be better maintained, and railcar rocking and swaying can be better controlled.

Referring briefly back to FIG. 2, the railcar 505 has a width W defining a y-direction, and in an embodiment each set 525 of assemblages comprises two assemblages 515 in the y-direction on each layer.

Figure 4:
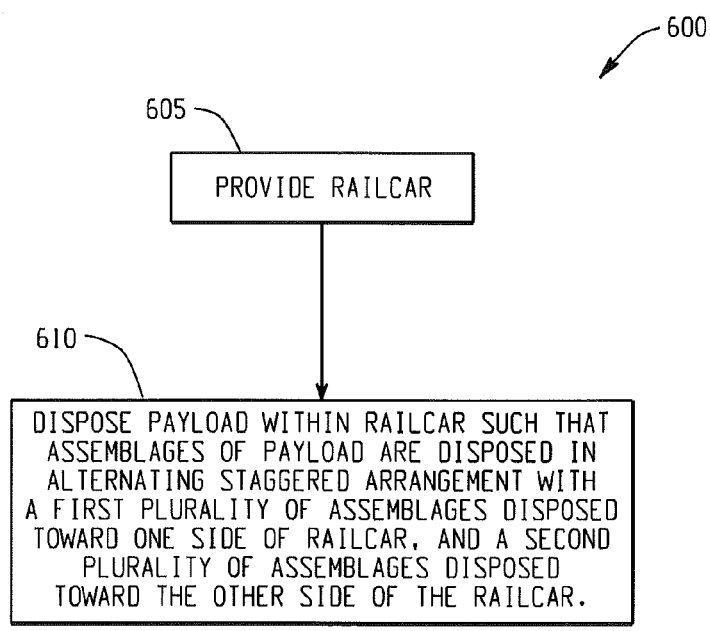
FIG. 4 depicts a flowchart of a method in accordance with an embodiment of the invention.

With reference now to FIG. 4, a method 600 of distributing product within a distribution system 500 is illustrated in flow diagram form. The method 600 includes: providing 605 a railcar having a length defining an x-direction, and disposing 610 within the railcar 505 a payload 510 having assemblages 515 of product, the product of each assemblage 515 being disposed upon a pallet 520, the assemblages 515 being arranged in sets 525 of assemblages along the x-direction, wherein the sets 525 of assemblages are disposed in an alternating staggered arrangement in the x-direction such that a first plurality of the sets 526 of assemblages are disposed substantially toward one side of the railcar 505, and a second plurality of the sets 527 of assemblages are disposed substantially toward the other side of the railcar 505. In view of the discussion to follow, it will also be appreciated that the method 600 can be further modified by any one or a combination of other features disclosed herein.

Figure 12:
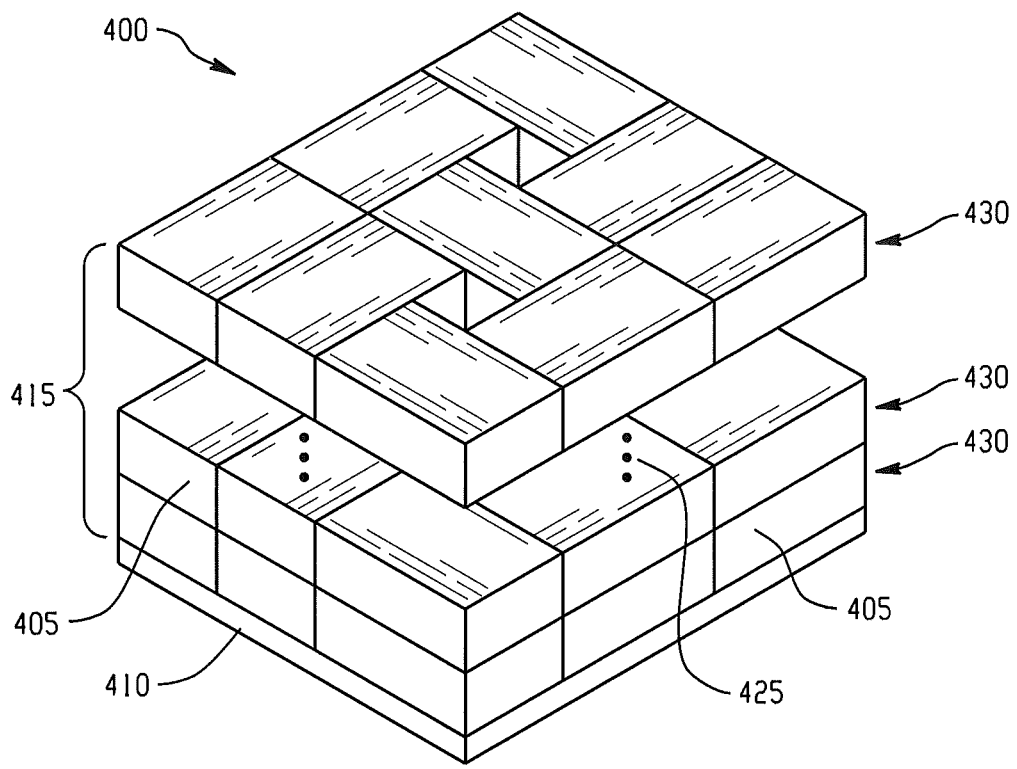
FIG. 12 depicts an isometric block diagram view of an example assemblage of containers for use in accordance with an embodiment of the invention.

With reference now to FIGS. 5-19 generally, an example assemblage 515 is illustrated as being an assemblage 100 of reams of paper as illustrated in FIGS. 5, 8A-8F, 9 and 10, and is alternatively illustrated as being an assemblage 400 of containers as illustrated in FIG. 12. For completeness, FIGS. 5-19 will now be described in more detail in two groupings, first FIGS. 5-11, then FIGS. 12-19.

Regarding FIGS. 5-11, an assemblage of a plurality of layers of reams of paper on a pallet is disclosed, with each layer being interlocked with an adjacent layer, and with the outer footprint of the assemblage being disposed on the pallet so as to minimize the underhang of the assemblage on the pallet, thereby providing an assemblage of reams of paper on a pallet having improved stability and transportability with respect to other prior art assemblages of reams of paper. While embodiments described herein depict a ream of paper made from paper sheets having specific nominal dimensions, such as 8.5-inches by 11-inches, for example, it will be appreciated that the disclosed invention is not so limited, and is also applicable to other paper sheets having other nominal dimensions, such as 11-inches by 17-inches, or A-size, for example.

Figure 5:
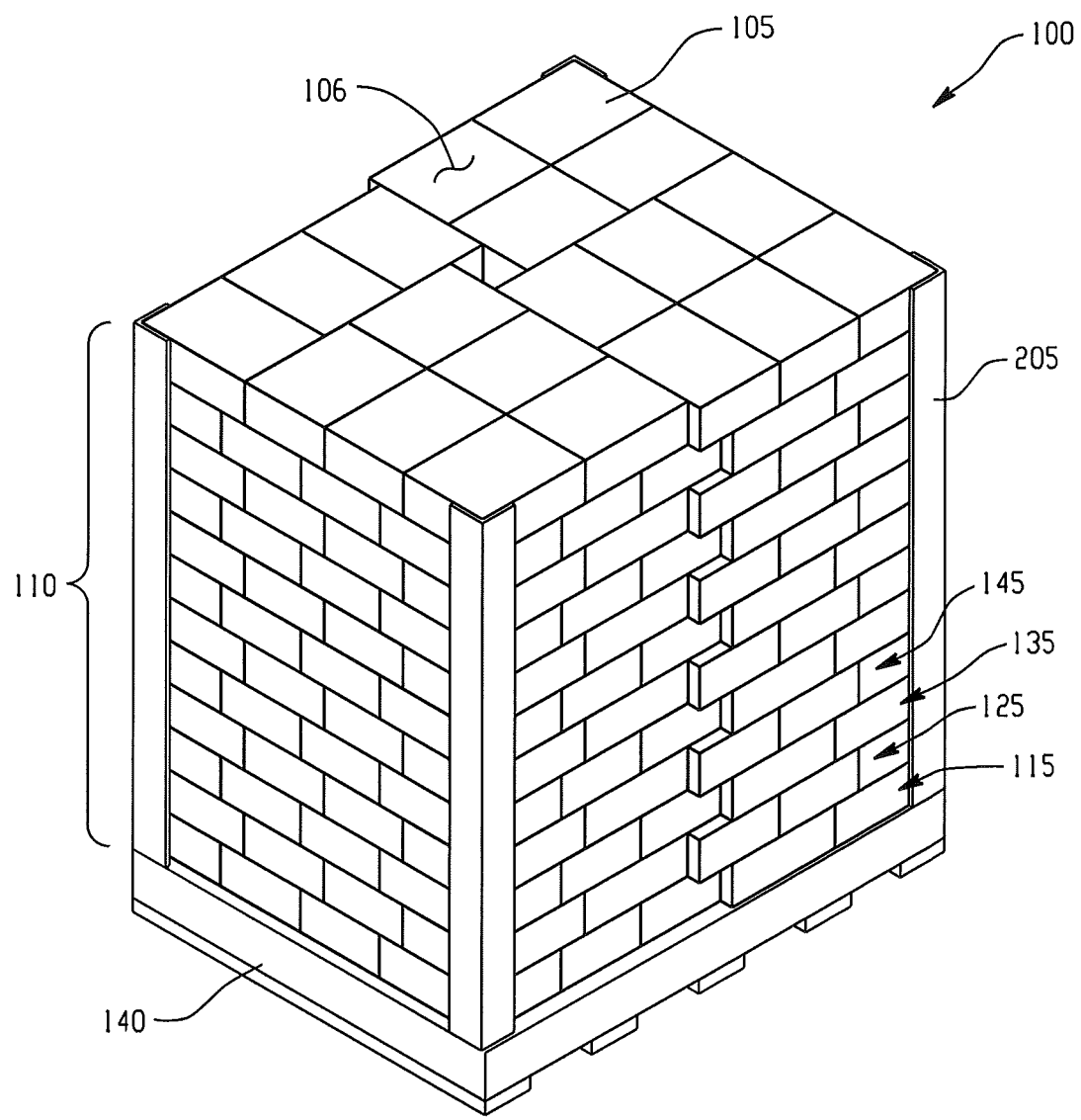
FIG. 5 depicts an example arrangement of a plurality of layers of reams of paper on a pallet for use in accordance with an embodiment of the invention.

FIG. 5 is an example embodiment of an assemblage 100 of reams of paper 105 disposed upon a pallet 140, which is also herein referred to as a transportable support platform. In an embodiment, the pallet 140 is a GMA (Grocery Manufacturers of America) pallet having industry standard nominal footprint dimensions of 40-inches by 48-inches, also known as a GMA Block pallet, which is an industry standard for pallets used in North American grocery and retail stores and warehouses. Another industry standard pallet is referred to as a Business to Business Block Pallet or Stringer Pallet of approximately 47-inches by 35.5-inches or 47.5-inches by 35.5-inches (herein also referred to as the B2B pallet). While embodiments of the invention are described herein with reference to a GMA pallet, it will be appreciated that the scope is not so limited, and that the invention also extends to other pallets such as a B2B pallet when used to practice embodiments of the invention disclosed herein.

The assemblage 100 includes a plurality of layers 110 of reams of paper 105, including a first layer 115 having a first arrangement 120 of reams (best seen by referring to FIG. 6), a second layer 125 having a second arrangement 130 of reams (best seen by referring to FIG. 7) disposed on top of the first layer 115, a third layer 135 having a third arrangement of reams disposed on top of the second layer 125, and a fourth layer 145 having a fourth arrangement of reams disposed on top of the third layer 135. In an embodiment, the second arrangement 130 is different from the first arrangement 120 so as to form interlocking first and second layers 115, 125 (best seen with reference to FIG. 5). Likewise, an embodiment has the third arrangement being different from the second arrangement (130), so as to form interlocking second and third layers 125, 135, and the fourth arrangement being different from the third arrangement, so as to form interlocking third and fourth layers 135, 145. As used herein, consistent with the various illustrations provided herein, the term interlocking layers refers to an arrangement of layers where: (i) adjacent layers have their respective plan view outlines arranged differently with respect to each other; or, (ii) reams of paper 105 in adjacent layers are not stacked in a tower fashion one on top of the other with perimeter edges aligned, but rather are stacked in a staggered fashion with perimeter edges misaligned. In an embodiment, the second arrangement 130 is a mirror image (flipped over 180-degrees) of the first arrangement 120, which can be seen by comparing FIG. 7 to FIG. 6. In an embodiment, the third arrangement (third layer 135) is the same as the first arrangement 120 (first layer 115), and the fourth arrangement (fourth layer 145) is the same as the second arrangement 130 (second layer 125) (best seen by the repetitive nature of layers illustrated in FIG. 5). In an embodiment, and as illustrated in FIG. 5, odd numbered layers of the plurality of layers, 115 and 135 for example, have the first arrangement 120, and even numbered layers of the plurality of layers, 125 and 145 for example, have the second arrangement 130. From the foregoing it will be appreciated that an embodiment includes a plurality of layers 110 of reams of paper 105, that is, first, second, third and fourth layers 115, 125, 135, 145 arranged in consecutive order one on top of the other, where the reams 105 are arranged in an alternating fashion such that the first layer 115 has an arrangement of reams 105 different from the second layer 125, the third layer 135 has an arrangement identical to the first layer 115, and the fourth layer 145 has an arrangement identical to the second layer 125.

Figure 8B:
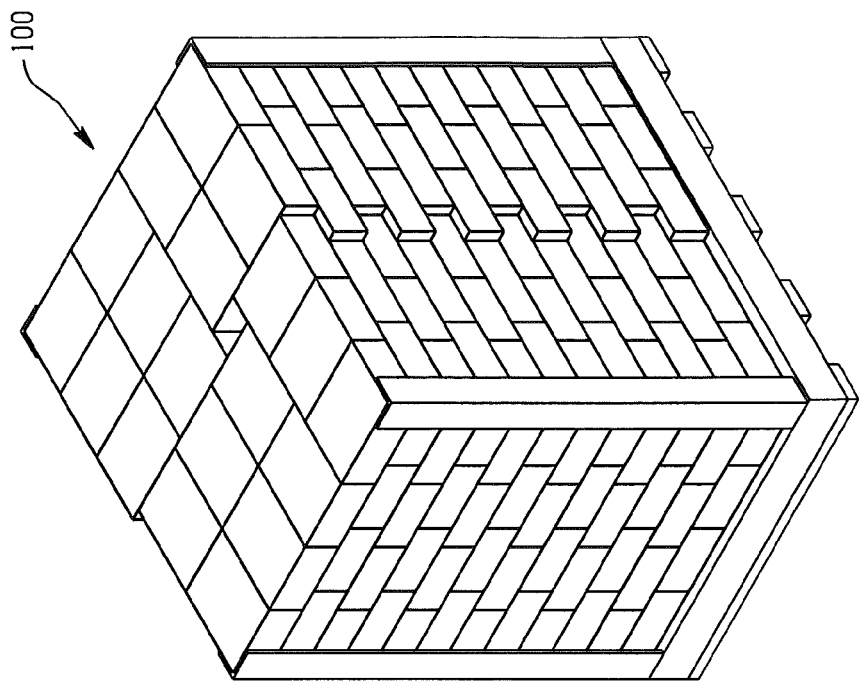
FIGS. 8A, B, C, D, E and F each depict example alternative arrangements to that of FIG. 5.
Figure 8A:
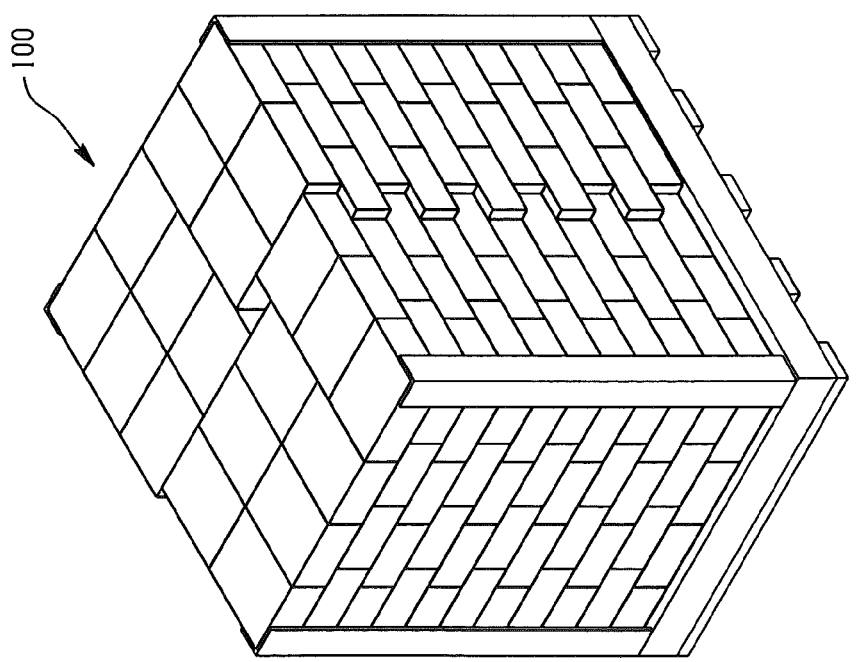
Figure 8D:
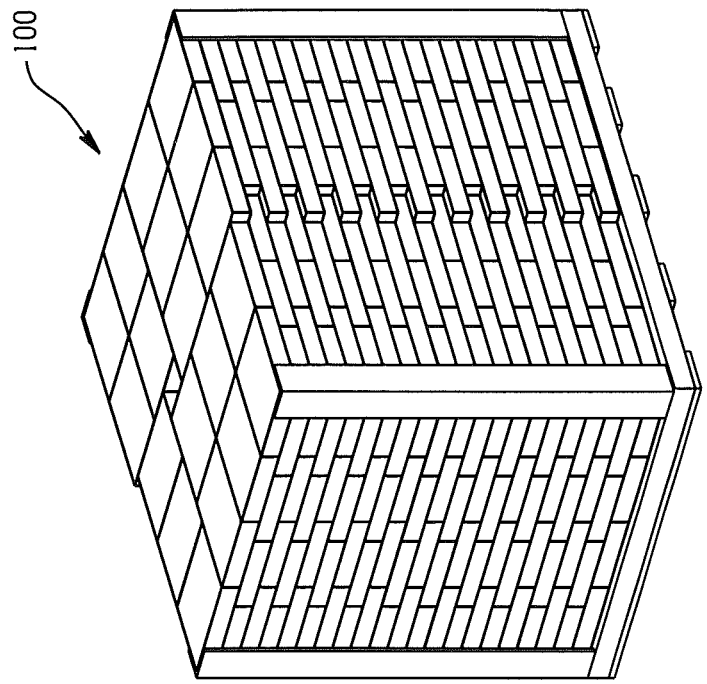
Figure 8C:
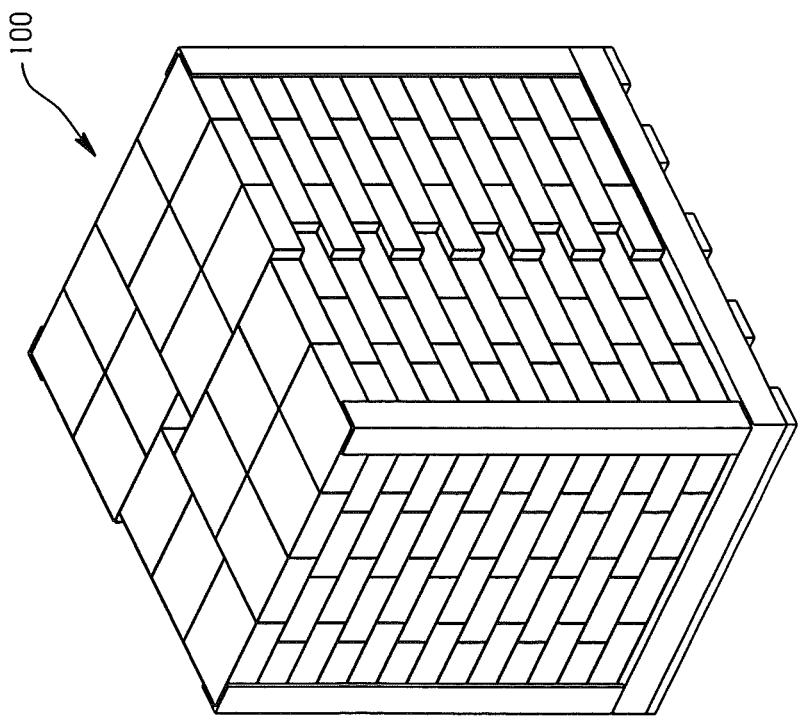
Figure 8F:
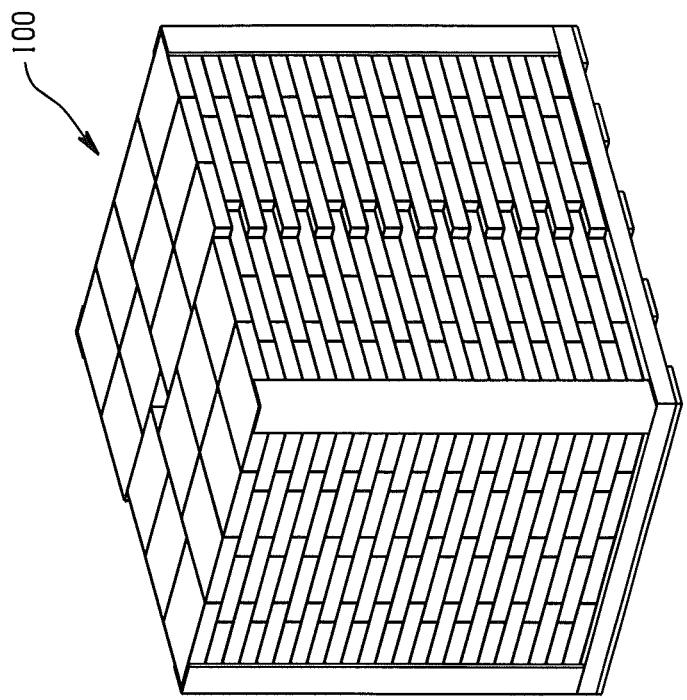
Figure 8E:
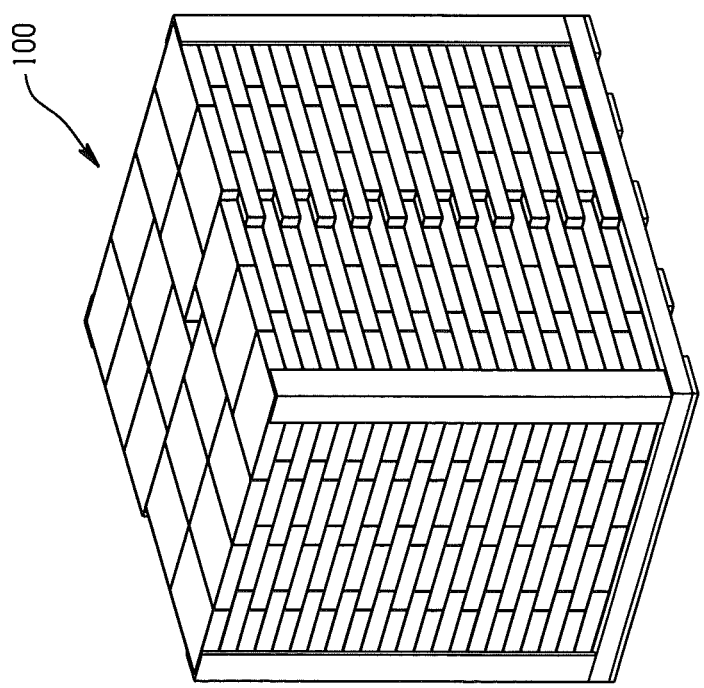

The embodiment of FIG. 5 depicts a plurality of layers 110 having a count of twelve layers, however, the invention is not limited to only twelve layers, and may encompass any number of layers suitable for the purposes disclosed herein (economical and stable transportation of reams of paper for example). For example, an embodiment of the invention may include an assemblage 100 having eleven, twelve, thirteen, twenty-one, twenty-two, or twenty-three layers (see FIGS. 8A, B, C, D, E and F for example), with an example embodiment having more than ten layers. For example, reams of paper sized as 24# 800-count may be palletized in eleven layers (FIG. 8A) or twelve layers (FIG. 8B), reams of paper sized as 24# 750-count may be palletized in twelve layers (FIG. 8B) or thirteen layers (FIG. 8C), reams of paper sized as 20# 500-count may be palletized in twenty-one layers (FIG. 8D), reams of paper sized as 20# 500-count or 24# 500-count may be palletized in twenty-two layers (FIG. 8E), and reams of paper sized as 24# 500-count may be palletized in twenty-three layers (FIG. 8F). Each ream of paper 105 is covered by a film material 106 (see FIG. 5 for example) that envelopes the respective ream of paper disposed therein, thereby fully containing the respective ream paper. An example film material 106 is Krystal-Ice Wrap, available from Coating Excellence International, Wrightstown, Wis. While the foregoing examples describe a certain weight/poundage (#) and quantity (count) of paper sheets per ream, it will be appreciated that the scope of the invention is not limited to only these examples, and also encompasses other weights and counts suitable for the purposes disclosed herein. In the foregoing examples, the paper size of each ream is 8.5-inches by 11-inches.

With reference back to FIGS. 5 and 6, the first layer 115 has a first arrangement 120 of reams of paper 105 formed by a first group 150 of reams 105 disposed in the lower left corner, a second group 155 of reams 105 disposed in the upper left corner, a third group 160 of reams 105 disposed in the upper right corner, and a fourth group 165 of reams 105 disposed in the lower right corner. As used herein, the terms "lower left corner", "upper left corner", "upper right corner" and "lower right corner" refer to the plan view of the first layer 115 as illustrated by the first arrangement 120 of FIG. 6, which is used to establish a common reference frame between all plurality of layers 110 in the assemblage 100. As can be seen from FIG. 6 (orientation as depicted on the page), an example assemblage 100 includes the first group 150 being arranged in 2-rows by 2-columns, the second group 155 being arranged in 2-rows by 3-columns, the third group 160 being arranged in 3-rows by 2-columns, and the fourth group 165 being arranged in 1-row by 3-columns. Furthermore, it can be seen from FIG. 6 that the first group 150 has its length (11-inch dimension, for example) oriented parallel with the length of the pallet 140 (48-inch dimension, for example), the second group 155 has its length oriented perpendicular to the length of the pallet 140, the third group 160 has its length oriented parallel with the length of the pallet 140, and the fourth group 165 has its length oriented perpendicular to the length of the pallet 140. As such, each group has an arrangement of reams of paper 105 different from each other group with respect to configuration (number of rows by number of columns) and/or orientation (paper length parallel with or perpendicular to pallet length). More generally, at least one of the first group 150, the second group 155, the third group 160, and the fourth group 165 has an arrangement of reams of paper 105 different from the other groups with respect to configuration and/or orientation of the respective reams 105. That is, the second layer 125 may have a fifth group of reams of paper 105 disposed in the lower left corner, a sixth group of reams of paper 105 disposed in the upper left corner, a seventh group of reams of paper 105 disposed in the upper right corner, and an eighth group of reams of paper 105 disposed in the lower right corner, where the fifth, sixth, seventh and eighth groups are different from the respective first, second, third and fourth groups 150, 155, 160, 165 with respect to configuration and/or orientation of the respective reams 105. In the embodiment depicted by FIGS. 6 and 7 (mirror images), the fifth group is the same as the second group 155, the sixth group is the same as the first group 150, the seventh group is the same as the fourth group 165, and the eighth group is the same as the third group 160, thereby resulting in the second layer 125 having a second group 155 of reams of paper 105 disposed in the lower left corner, a first group 150 of reams of paper 105 disposed in the upper left corner, the fourth group 165 of reams of paper 105 disposed in the upper right corner, and the third group 160 of reams of paper 105 disposed in the lower right corner.

Figure 6:
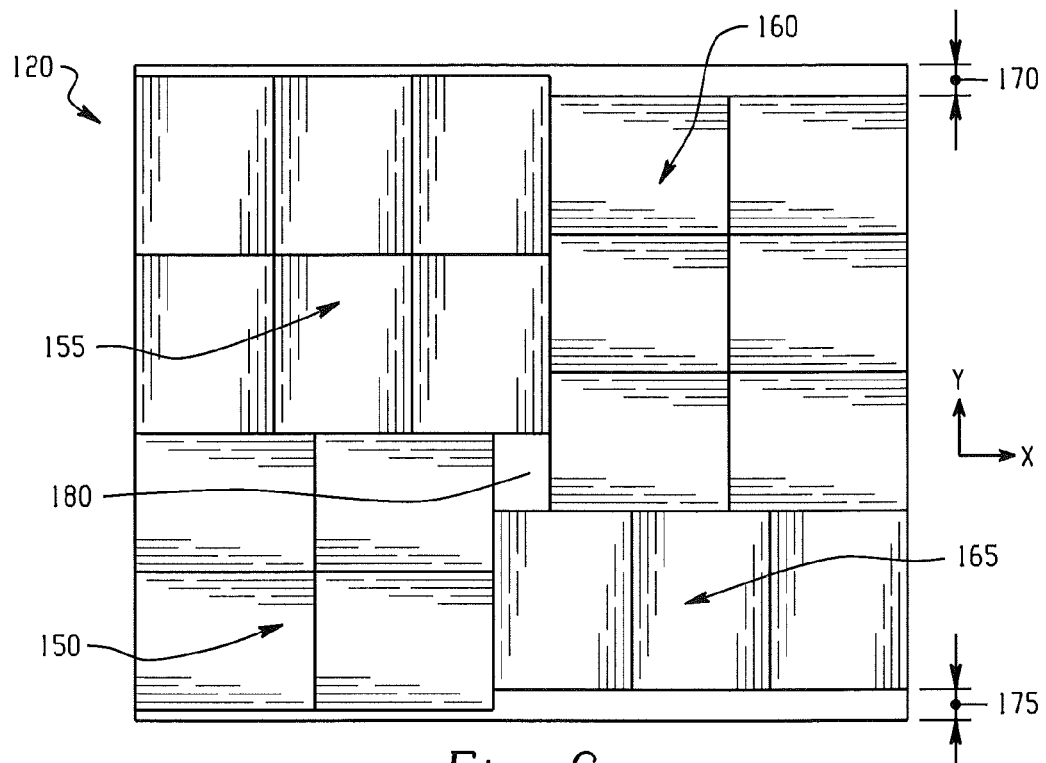
FIG. 6 depicts an example plan view of a first layer of the arrangement of FIG. 5.
Figure 7:
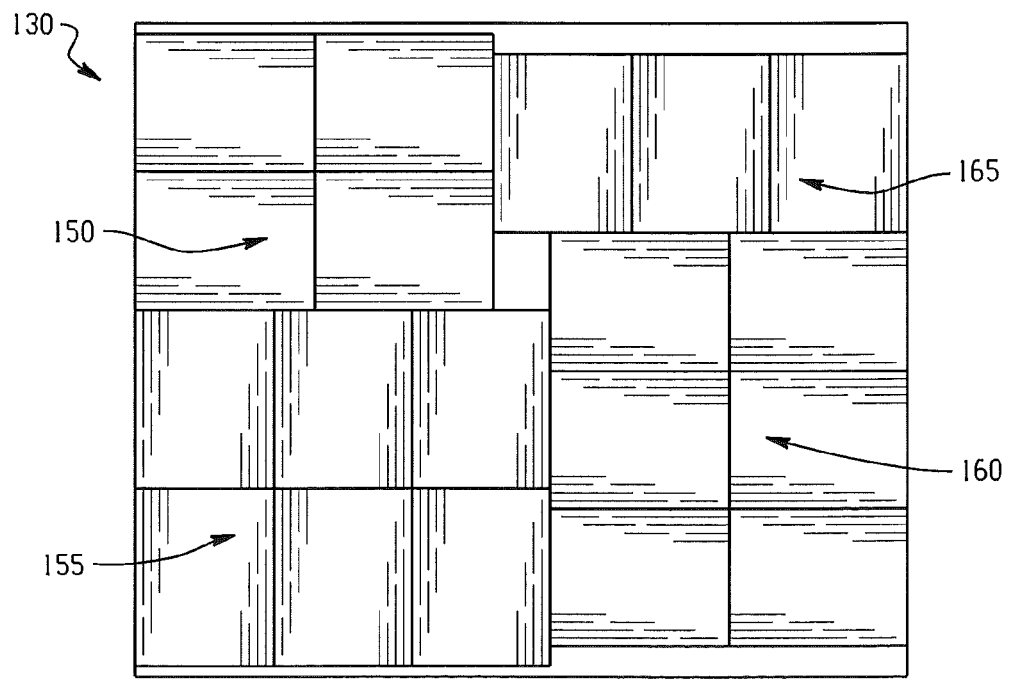
FIG. 7 depicts an example plan view of a second layer of the arrangement of FIG. 5.

From the foregoing, and with reference now to FIG. 6, it will be appreciated that the first arrangement 120 having different groups of reams with different configurations and/or orientations will produce an outside footprint that is not a perfect rectangle (the outside footprint having a stepped profile), as evidenced by the first underhang dimension 170 associated with the third group 160, the second underhang dimension 175 associated with the fourth group 165, and the void 180 generally central to all four groups. In the embodiment depicted in FIG. 6 (40-inch wide pallet with 8.5-inch by 11-inch reams of paper, for example), each underhang dimension 170, 175 calculates to be about 1.75-inches, but only along a portion of the length of the pallet 140. Additionally in an embodiment, the footprint area of the first arrangement 120 (excluding the void 180) calculates to be about 1,776.5-square-inches (19 reams times 8.5-inches by 11-inches), which is about 92.53%, or nominally 93%, of the footprint area of the pallet 140 (40-inches by 48-inches, or 1,920-square-inches). As such, the first arrangement 120 of reams of paper 105, and consequently the mirror image second arrangement 130, has a footprint with an area of coverage that is greater than 85% of the pallet footprint area, and in an embodiment is about 93% of the pallet footprint area. Relative to a ratio of areas, the percentage of underhang of the example embodiment described above would be about 7%. However, as can be seen by reference to FIG. 6, the underhang is more pronounced on the sides of third and fourth groups 160, 165 and less pronounced on the sides of first and second groups 150, 155. Applying the example nominal dimensions discussed above for 8.5-inch by 11-inch reams of paper on a GMA pallet, the 1.75-inch underhangs 170, 175 each equate to about 4% underhang (1.75/40). Thus, and relative to a ratio of dimensions, the average percentage of underhang of the example embodiment described above would be about 4% on each side of the pallet 140, but over only a portion of the length of the pallet 140. More specifically, and relative to the same example embodiment discussed above, the dimension across first and fourth groups 150, 165 in the X-direction is nominally 47.5-inches, the dimension across second and third groups 155, 160 in the X-direction is nominally 47.5-inches, the dimension across first and second groups 150, 155 in the Y-direction is 39-inches, and the dimension across third and fourth groups 160, 165 is 36.5-inches. As such, and relative to a ratio of dimensions, the average percent underhang on the left and right sides of the pallet 140 is about 0.5% (0.25/48), and the average percent underhang on the top and bottom sides of the pallet 140 is about 1% (0.5/40) on the left side, and about 4% (1.75/40) on the right side as discussed above. By maximizing the footprint area and minimizing the underhang of the assemblage 100 of reams 105 of paper on a pallet 140, a more stable arrangement of reams 105 on a pallet 140 can be achieved. As can be seen from the example embodiment described herein, minimizing the underhang over only a portion of the length of the pallet 140 will still be effective in preventing undesirable shifting of the assemblage 100 during transportation.

With regard to footprint, it will be appreciated from the foregoing discussions relating to the second arrangement 130 being a mirror image of the first arrangement 120, and the first arrangement 120 having a stepped footprint profile, that the second arrangement 130 will have a stepped footprint profile that is a mirror image of the stepped footprint profile of the first arrangement 120.

Figure 9:
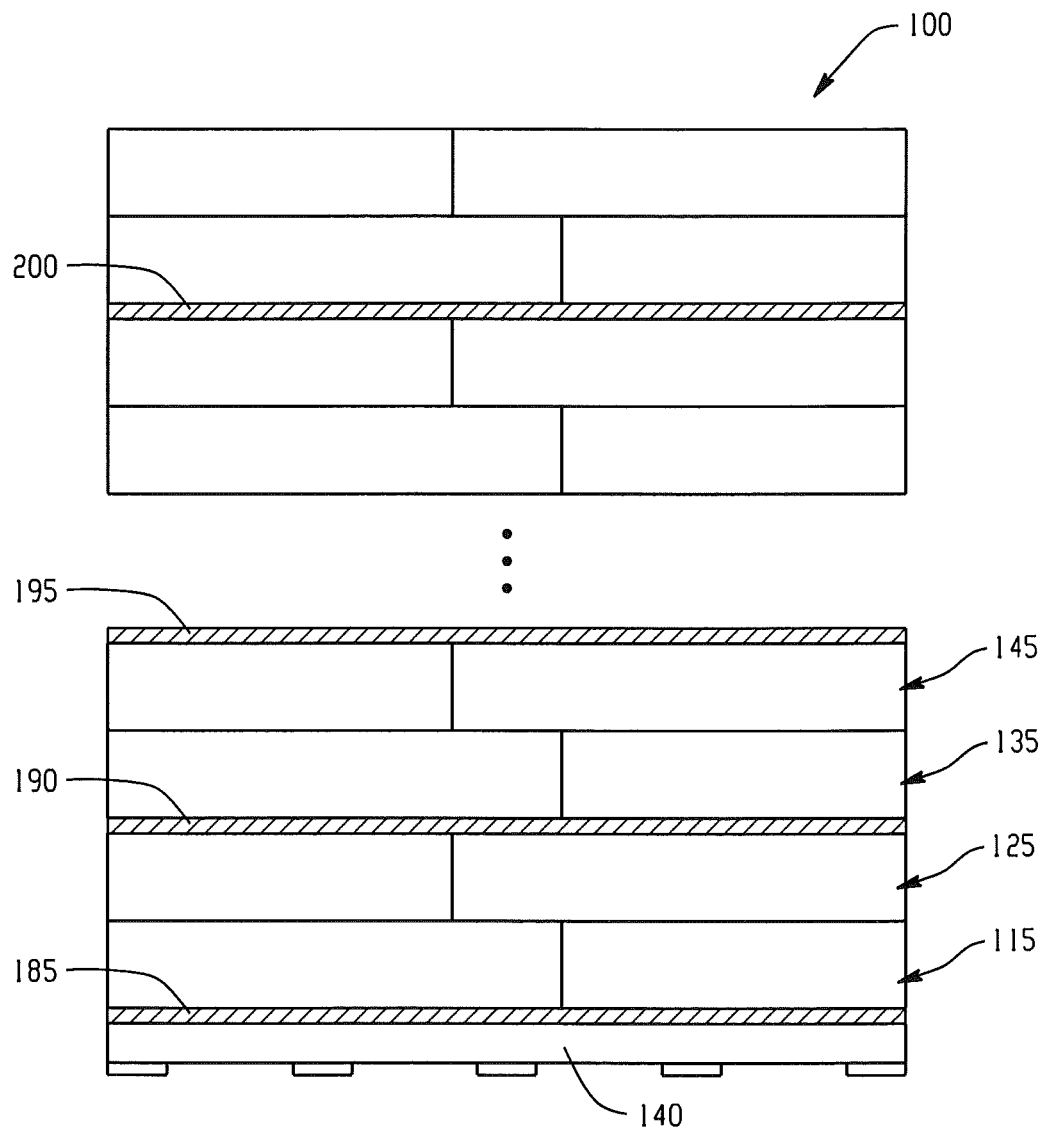
FIG. 9 depicts an example side view of a plurality of layers of reams of paper on a pallet having slip sheets placed for use in accordance with an embodiment of the invention.
Figure 10:
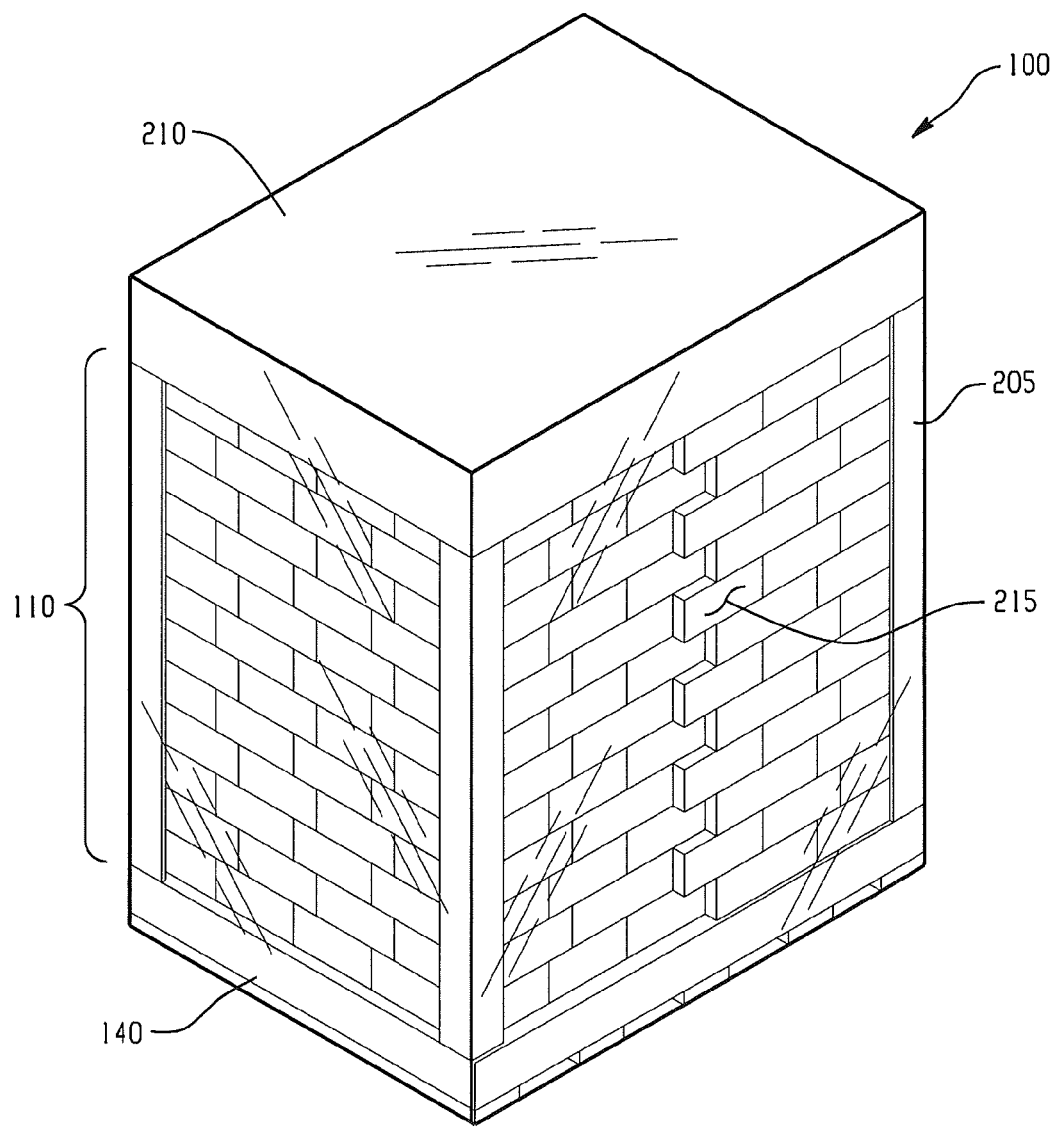
FIG. 10 depicts an arrangement similar to that of FIG. 5 with corner boards, a top cap, and stretch wrapping, all arranged for use in accordance with an embodiment of the invention.

Referring now to FIGS. 5, 9 and 10, an embodiment includes a first slip sheet 185 disposed between the first layer 115 and the pallet 140. In addition to the first slip sheet 185, another embodiment includes a plurality of slip sheets 190, 195, 200 with each one of the plurality of slip sheets being disposed between every two layers of the plurality of layers 110 of reams of paper 105. In an embodiment, only a second slip sheet, one of 190, 195 and 200, is disposed between an adjacent pair of layers of the plurality of layers 110 of reams of paper 105. The slip sheets, which may or may not be corrugated, serve to protect the reams of paper 105 from abrasion and prevent slippage during transport.

In an embodiment, the plurality of layers 110 forming the assemblage 100 are so disposed as to define four outer corners having four vertical edges extending from a lower most layer to an upper most layer, upon which a corner board 205 is disposed along each of the four edges. In an embodiment, a top cap 210 is disposed on top of the upper most layer. In yet another embodiment, a stretchable film material 215 is wrapped in a plurality of continuous layers around at least four sides of the assemblage 100, and in an embodiment is wrapped in a plurality of continuous layers around all six sides of the assemblage 100 in a pinwheel fashion. An example material used for the corner board 205 is Light Duty Edge Protector Model No. S-3857, available from ULINE, Waukegan, Ill. An example equipment used for placing the corner boards 205 is Model No. S-3500 with Cornerboard Placer, available from Lantech, Louisville, Ky. An example material used for the top cap 210 is Bulk Cargo Cover Model No. S-4480T, available from ULINE, Waukegan, Ill. An example material used for the stretchable film material 215 is PalleTech® Ultra Performance Stretch Film, available from Berry Plastics Corporation, Minneapolis, Minn. An example equipment used for wrapping the stretchable film material 215 is the S-1550/S-2500 Automatic Straddle Stretch Wrapping System, available from Lantech, Louisville, Ky.

From the foregoing, it will be appreciated that the scope of the invention not only encompasses structure of the assemblage 100 of reams of paper 105, but also encompasses a method of forming the assemblage 100, or more specifically, and with reference now to FIG. 11, a method of assembling a plurality of layers of reams of paper 110 on a transportable support platform 140 using a palletizer 300 comprising a controller 305 having a processing circuit 310 responsive to executable instructions which when executed by the processing circuit causes the palletizer 300 to form the assemblage 100 as herein fully described above. An example palletizer 300 useful for the purposes disclosed herein is contemplated to be available from Alvey, an FKI Logistex Company, St. Louis, Mo. However, the specific executable instructions suitable for practicing embodiments of the claimed invention is considered within the ambit of the disclosed invention herein, which discloses an end arrangement of reams of paper 105 on a pallet 140 having desired layers suitable for the purposes disclosed herein.

In an embodiment, a slip sheet 185 is assembled on top of the pallet 140 prior to assembling the first layer 115 on top thereof. Another slip sheet 185 may be assembled on top of the second layer 125 prior to assembling the third layer 135, and on top of every other subsequent layer prior to assembling a next layer on top thereof, as discussed above. Also as discussed above, after assembling a final one of the plurality of layers 110 of reams of paper 105, corner boards 205 may be placed at each one of four corners around the perimeter of the assemblage 100, a top cap 210 may or may not be assembled on top of the upper most layer, and a stretchable film material 215 may be wrapped in a plurality of continuous layers around at least four sides of the assemblage 100, or alternatively the stretchable film material 215 may be wrapped in a plurality of continuous layers around six sides of the assemblage 100.

As disclosed herein, an embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, such as random access memory (RAM), read only memory (ROM), or erasable programmable read only memory (EPROM), for example, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to arrange reams of paper on a pallet, absent boxed enclosures containing sets of reams, for economical and stable transportation.

Now regarding FIG. 12-19, an assemblage of a plurality of layers of containers on a pallet is disclosed, with each container containing a plurality of reams of paper, and with the outer footprint of the assemblage being disposed on the pallet so as to minimize the underhang of the assemblage on the pallet, thereby providing an assemblage of containers on a pallet having improved stability and transportability with respect to other prior art assemblages of containers containing reams of paper. While embodiments described herein depict a ream of paper made from paper sheets having specific nominal dimensions, such as 8.5-inches by 11-inches, for example, it will be appreciated that the scope of the disclosed invention is not so limited, and is also applicable to other paper sheets having other nominal dimensions, such as 11-inches by 17-inches, or A-size, for example, when used in accordance with an embodiment of the invention.

Referring to FIG. 12, an example embodiment is disclosed of an assemblage 400 (interchangeable with assemblage 515) of containers 405 disposed upon a pallet 410, which is also herein referred to as a transportable support platform. In an embodiment, the pallet 410 is a GMA (Grocery Manufacturers of America) pallet having industry standard nominal footprint dimensions of 40-inches by 48-inches, also known as a GMA Block pallet, which is an industry standard for pallets used in North American grocery and retail stores and warehouses. While embodiments of the invention are described herein with reference to a GMA pallet, it will be appreciated that the scope is not so limited, and that the invention also extends to other pallets when used to practice embodiments of the invention disclosed herein.

Figure 15:
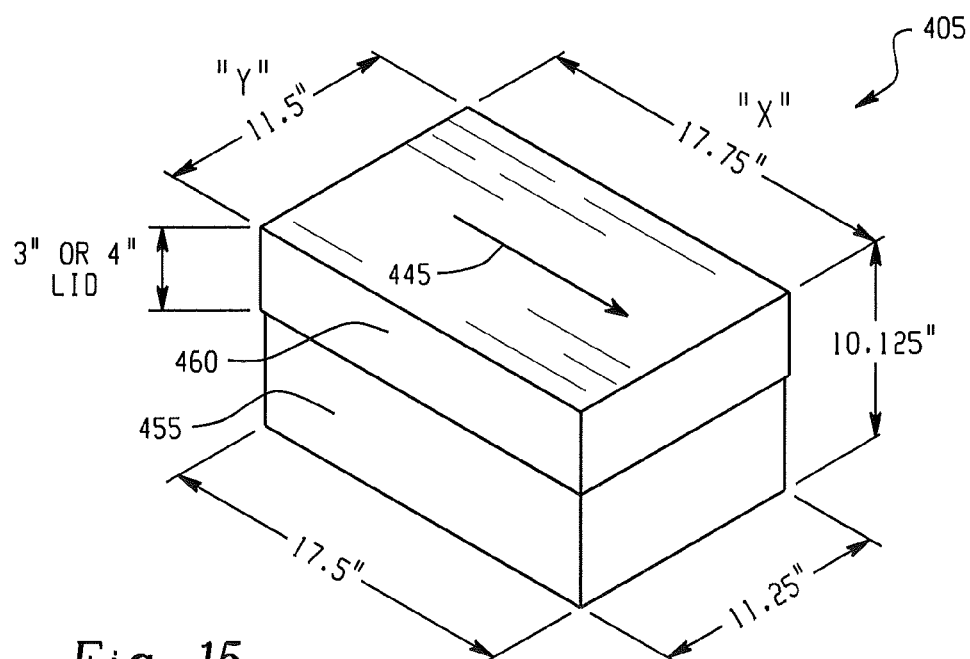
FIG. 15 depicts an isometric view of an example container for use in accordance with an embodiment of the invention.
Figure 16:
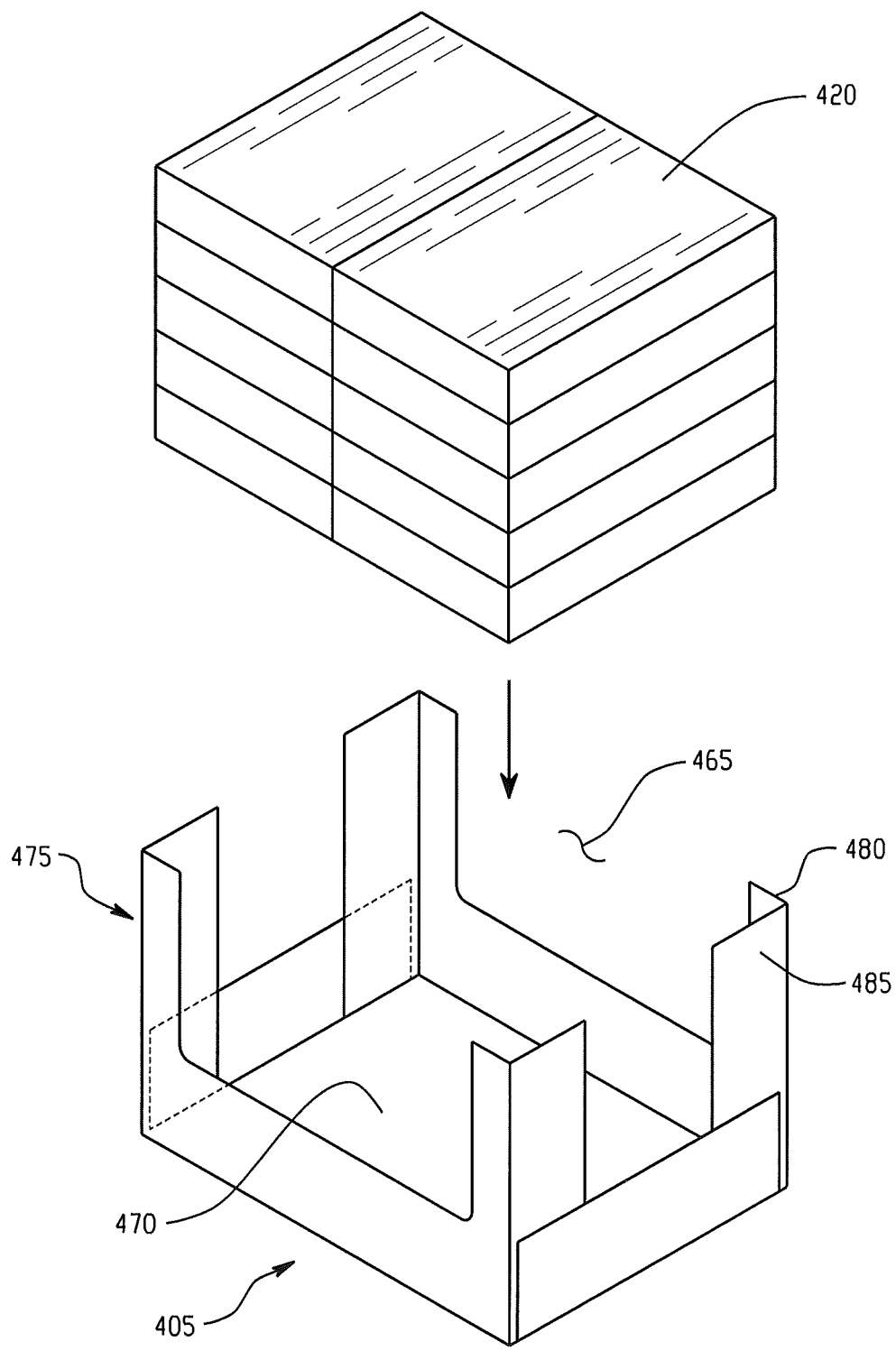
FIG. 16 depicts an isometric view of an example stack of reams of paper assemblable into a container for use in accordance with an embodiment of the invention.

The assemblage 400 is formed by layering a plurality of layers 415 of containers 405 on top of each other, with each container containing a plurality of reams of paper 420 (see FIG. 16 for example), and with the entire plurality of layers 415 being supported by the pallet 410. In an embodiment, the plurality of reams of paper 420 has a count of ten reams, as illustrated in FIG. 16. In an embodiment, the plurality of layers 415 of containers 405 has a count of four or five layers (equal to or greater than four layers and equal to or less than five layers, for example), which is indicated by the ellipsis 425 in FIG. 12. In an embodiment, each container 405 contains a same quantity of the plurality of reams of paper 420. Container 405 may have solid walls as illustrated in FIG. 15 or open walls as illustrated in FIG. 16. With open walls as illustrated in FIG. 16, and because the carton has no lid, the reams of paper may be easily accessed from the assemblage 400 from any direction the carton is facing. With reference still to FIG. 16, at least one container 405 of the plurality of layers of containers 415, and in an embodiment each container 405 of the plurality of layers of containers, includes a plurality of open sides 465 that provide access to an interior of the one container 405, and in an embodiment, all four sides of each container 405 are open (as illustrated).

Figure 18:
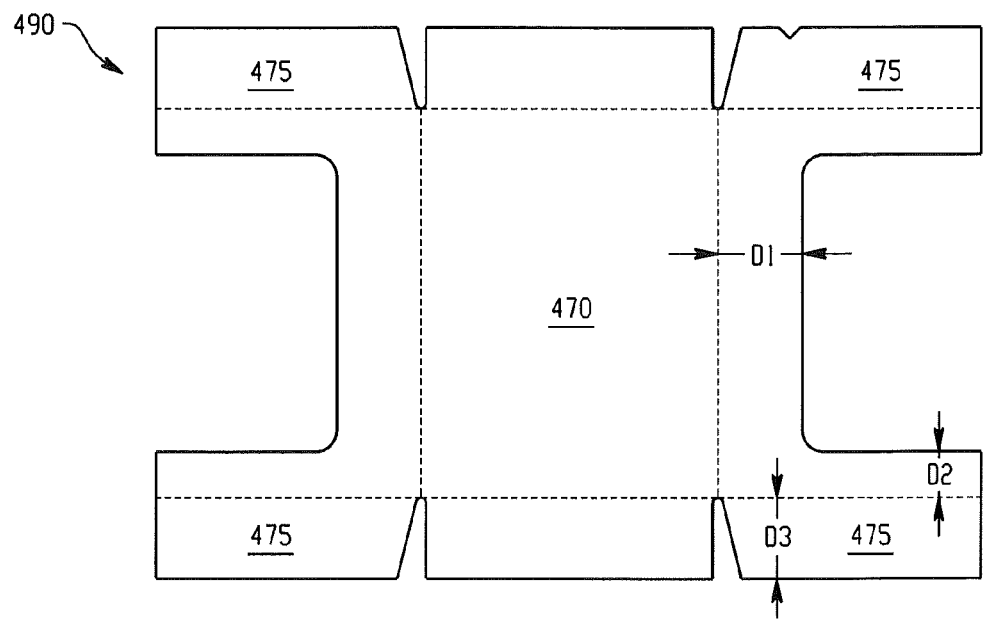
FIGS. 18 and 19 depict plan views of example flat blanks suitable for forming a container for use in accordance with an embodiment of the invention.
Figure 19:
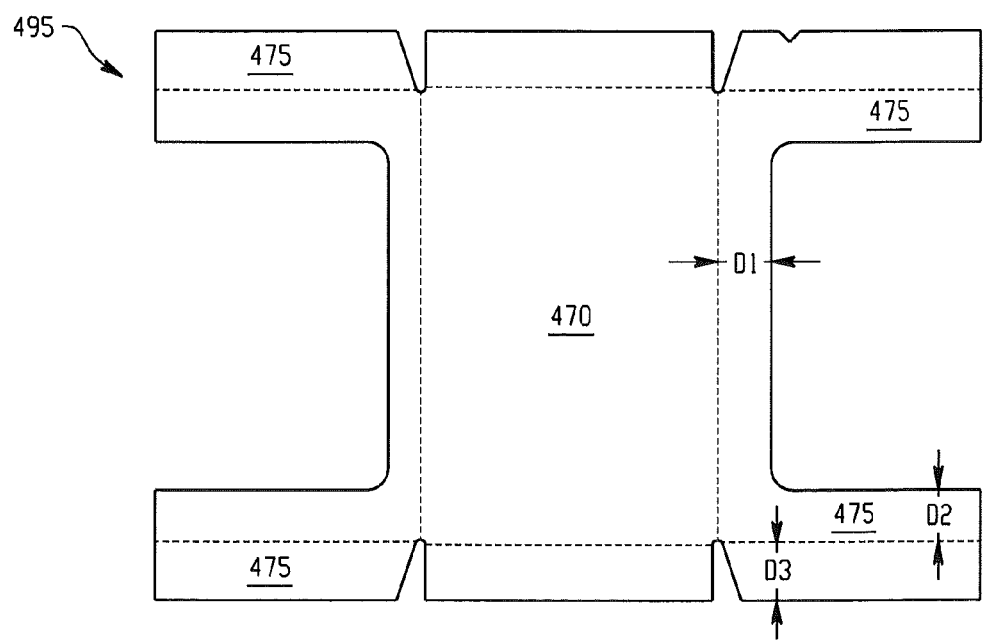

In an embodiment, the container 405 as illustrated in FIG. 16 includes a base tray 470 and four corner supports 475 extending upwardly therefrom, each of the four corner supports 475 having two integrally arranged and orthogonally disposed support faces 480, 485. As illustrated in FIG. 16, each of the plurality of corner supports 475 are connected at one end to the base tray 470, and are free floating at a second opposite end. The base tray 470 and the plurality of corner supports 475 are disposed and configured so as to support ten reams of paper 420 arranged in two side-by-side stacks of five reams each (as illustrated in FIG. 16 for example), with each ream 420 having a sheet count of at least 500 sheets of paper, and with each sheet of paper having nominal plan view dimensions of about 8½ inches by 11 inches, for example. FIGS. 18 and 19 depict alternative plan views of flat blanks 490, 495 suitable for forming the container 405 depicted in FIG. 16, where the base tray 470 and the plurality of corner supports 475 are defined by and formed from a folded flat blank of material, such as corrugated cardboard for example.

Both plan views show an H-pattern formed from corrugated cardboard, with the four legs of the H-pattern forming the four corner supports 475. In general, flat blanks 490, 495 differ by the dimensions given to dimensions D1, D2 and D3, which form structural features for retaining the reams of paper 420 contained within container 405.

Figure 13:
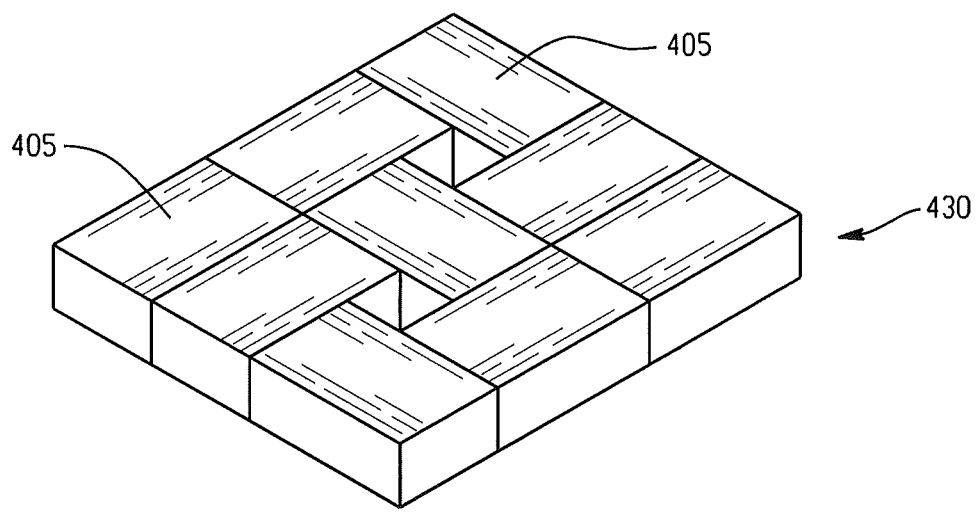
FIG. 13 depicts an isometric view of a layer of containers of the assemblage of FIG. 12.

Referring now to FIG. 13 illustrating one layer 430 of containers 405, an embodiment of the assemblage 400 has each layer of the plurality of layers 415 with a count of nine containers 405, three of the nine containers (labeled A in FIG. 14) having their associated longitudinal axis (see arrow 445 in FIG. 15) oriented in a first direction, and six of the nine containers (labeled B in FIG. 14) having their associated longitudinal axis 445 oriented in a second direction orthogonal to the first direction. More generally, and with reference to FIGS. 13-15, the plurality of containers 405 includes a first set of containers (A containers in FIG. 14) having their associated longitudinal axis 445 oriented in a first direction, and a second set of containers (B containers in FIG. 14) having their associated longitudinal axis 445 oriented in a second direction orthogonal to the first direction. In an embodiment, the plurality of containers 405 of each layer 430 have a container count that is an odd number (A count plus B count is nine in FIG. 14, for example), with the first set having a container count that is an odd number (A count is three in FIG. 14, for example), and with the second set having a container count that is an even number (B count is six in FIG. 14, for example). In an embodiment, the first set (A containers) has a container count that is one-half the container count of the second set (B containers). In an embodiment, the first set (A containers) has each associated longitudinal axis 445 oriented perpendicular to a longitudinal axis 499 of the platform (see arrow 499 in FIG. 14 depicting direction of the longitudinal axis 499), and the second set (B containers) has each associated longitudinal axis 445 oriented parallel to the longitudinal axis 499 of the platform.

Figure 14:
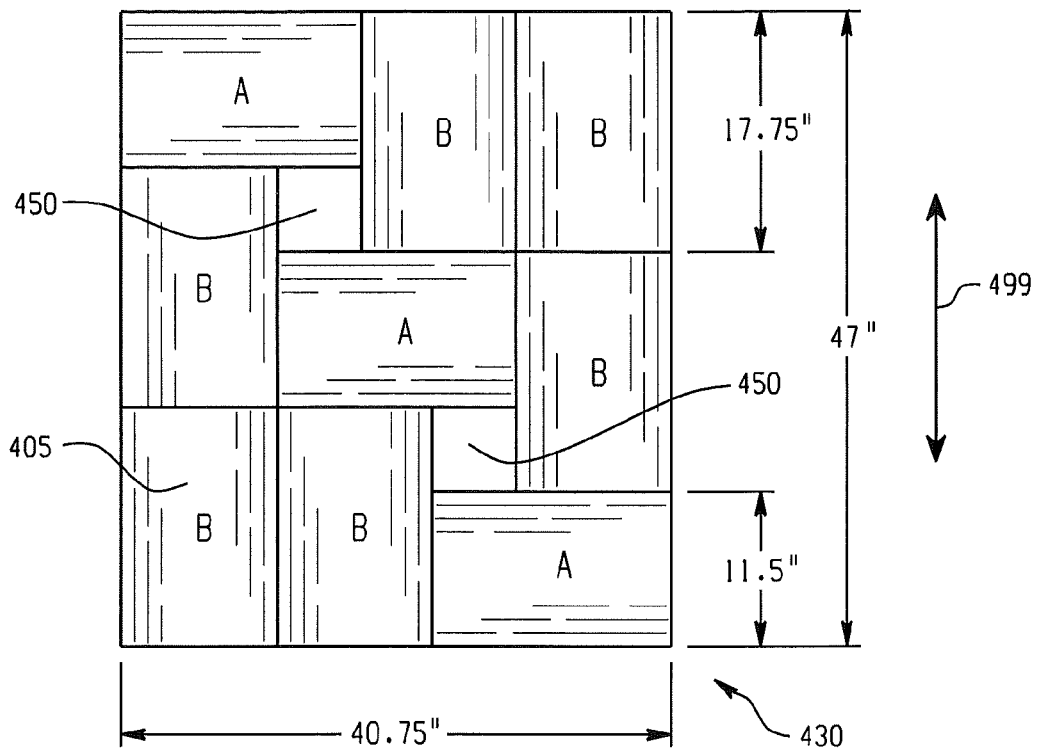
FIG. 14 depicts a plan view of the layer of FIG. 13.

With reference to FIGS. 13 and 14, FIG. 14 being a plan view of FIG. 13, each layer 430 of the plurality of layers 415 forms a rectangular perimeter defined by outer surfaces of eight of the nine containers, A-B-B-B-A-B-B-B (excluding central container A), for example. In an embodiment, the containers 405 of each layer 430 are so arranged as to form at least one square void, and more typically two square voids, 450 within the area defined by the perimeter. As can be seen by reference to FIGS. 13 and 14, a centrally disposed one of the nine containers 405 (labeled A) has its longitudinal axis oriented in a direction different from any one of the remaining eight containers 405 in close enough proximity to touch a side of the centrally disposed one container 405, which amounts to four of the eight remaining containers 405 (labeled B). Furthermore, the centrally disposed one of the nine containers 405 (labeled A) has its longitudinal axis 445 oriented in a direction different from any one of the remaining eight containers 405 in close enough proximity to touch a side or a corner of the centrally disposed one container 405, which amounts to six of the eight remaining containers 405 (labeled B). The aforementioned arrangement provides for an economical arrangement of containers 405 on a GMA pallet for both shipping and destination stacking without the need for pyramiding.

Referring now to FIG. 15, an embodiment includes container 405 having solid walls defined by a base 455 and a lid 460 formed from separate folded blanks cut from corrugated cardboard. As illustrated, an embodiment includes outer dimensions of the base 455 being 17½ inches by 11¼ inches, and outer dimensions of the lid 460 being 17¾ inches by 11½ inches, which is suitable for holding side-by-side stacks of reams of paper measuring 11 inches by 8½ inches.

Figure 17:
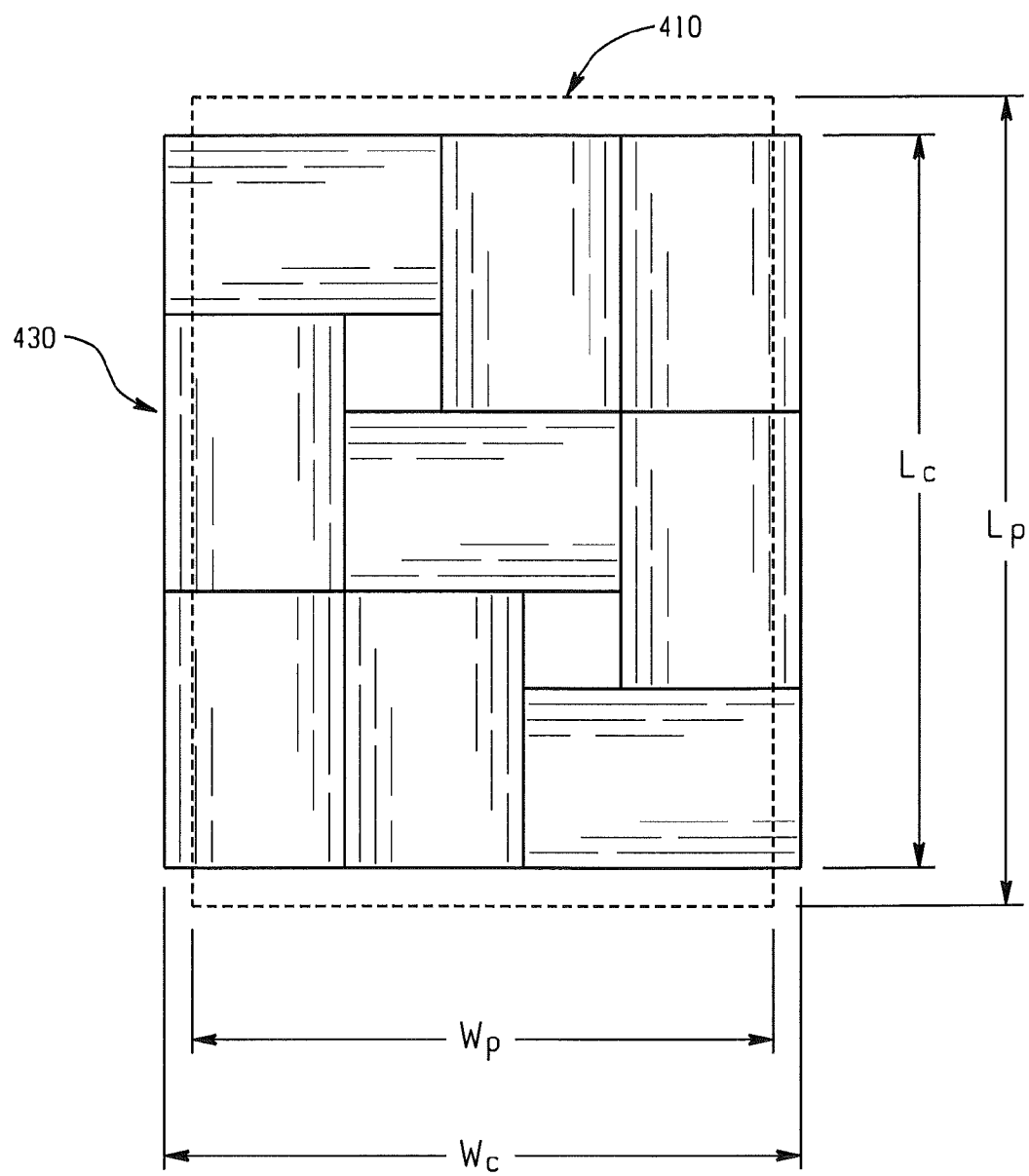
FIG. 17 depicts a plan view of an example layer of a plurality of containers relative to a plan view of an example pallet arranged for use in accordance with an embodiment of the invention.

Referring now to FIG. 17, which illustrates a plan view of the layer 430 in solid line fashion and a plan view of the pallet 410 in dashed line fashion, Wc represents the width of the layer 430 of containers 405, Wp represents the width of the pallet 410, Lc represents the length of the layer 430 of containers 405, and Lp represents the length of the pallet 410. From the aforementioned discussions relating to the dimensions of the containers 405 and the GMA pallet 410, the dimensions for Wc, Wp, Lc and Lp in an embodiment can be readily ascertained to be:

Wc=40¾ inches
Wp=40 inches
Lc=47 inches
Lp=48 inches.

A comparison of the dimensions illustrated in FIGS. 14 and 15 confirm the dimensions for Wc and Lc.

With reference to FIG. 17, it can be seen from the example presented that the width Wp of the pallet 410 is slightly less (by about ⅜ inches per side in the example illustrated) than the width Wc of the layer 430 of containers 405, resulting in a slight overhang on each side, and that the length Lp of the pallet 410 is slightly greater (by about ½ inches per end in the example illustrated) than the Lc of the layer 430 of containers 405, resulting in a slight underhang on each end. By selectively arranging the containers 405 as described herein and presented by example illustration, the amount of underhang of containers 405 on a pallet 410, such as GMA pallet 410 for example, can be minimized with minimal overhang, thereby providing an improved pallet stacking configuration that can be tightly arranged side-by-side in a shipping container, such as tractor trailer or rail car for example, with very little space therebetween to reduce the likelihood of sideways shifting during transit. By matching the pallet area footprint as much as possible with the carton layer configuration footprint to minimize underhang, an assemblage of containers 405 on a pallet 410 is achieved having improved stability and transportability with respect to other prior art assemblages of containers containing reams of paper. As will be appreciated, it is desirable to avoid any significant overhang of the cartons relative to the pallet 410, as an excessive overhang opens opportunity for product damage. The amount of overhang described and illustrated herein (⅜ inches per side for example), has been shown to be acceptable for the purposes disclosed herein.

In view of the foregoing, it will be appreciated that an embodiment includes a footprint of the plurality of layers of containers having an overall area Wc×Lc of 1,915.25 square-inches, which is 99.75% (greater than 99%) of the pallet footprint having an overall area Wp×Lp of 1,920 square-inches. Stated alternatively, and since Wc is greater than Wp by ¾ inches, it is also accurate to say that the footprint of the plurality of layers covers 97.9% (at least 97%) of the platform footprint area: (40×47)/(40×48)=97.9%.

Container 405 may be sized to hold reams of paper 420 made from paper sheets having specific nominal dimensions, such as 8.5-inches by 11-inches, for example. However, it will be appreciated that the disclosed invention is not so limited to just one paper size, and is also applicable to other paper sheets having other nominal dimensions, such as 11-inches by 17-inches, or A-size, for example, when used in accordance with an embodiment of the invention.

From the foregoing description and illustration relating to FIGS. 1-4 in combination with the descriptions and illustrations relating to FIGS. 5-19, it will be clearly appreciated that assemblage 515 described and illustrated herein may be any assemblage 100, 400 described in relation to FIGS. 5-19, as each of those assemblages 100, 400 have substantially reduced underhangs as compared to prior art systems and are therefore well suited for the purposes disclosed herein (reduced rock and sway when stacked in a railcar as disclosed herein).

By utilizing the assemblages 100, 400 so described and illustrated in reference to FIGS. 5-19 as assemblage 515 in railcar 505, a highly efficient packing density is achieved, which Applicants have determined can reduce the volume needed to ship product by about 2.8%, which is significant when viewed in the context of many railcars being used in a given distribution event.

Some embodiments of the invention disclosed herein may provide some or all of the following significant advantages over the prior art, such as: providing improvements in the art of product transportation and distribution that is more economical and offers a "green" solution to the use of dunnage; palletizing a plurality of layers of containers containing reams of paper in a more ecologically friendly manner that is also suitable for stable long distance transportation by railcar and stable stacking at the destination point; and, palletizing a plurality of layers of reams of paper in a more ecologically friendly manner that is suitable for stable long distance transportation by railcar.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A distribution system, comprising:
a railcar having a length defining an x-direction; and
a payload disposed within an interior of the railcar;
wherein the payload comprises a plurality of assemblage of products, each of the assemblage of products being disposed upon a pallet, the assemblages being arranged in rows of assemblages along the x-direction;
wherein the rows of assemblages are disposed in an alternating, staggered arrangement in the x-direction such that one of the rows of assemblages is disposed substantially closer to a first side of the railcar than to a second side of the railcar, and an adjacent one of the rows of assemblages is disposed substantially closer to the second side of the railcar than the first side of the railcar;
wherein each assemblage of products comprises, an assemblage of reams of paper, comprising a plurality of layers of reams of paper arranged in an alternating fashion such that a first of the layers has an arrangement of reams different from a second of the layers, a third of the layers is arranged identical to the first layer, and a fourth of the layers is arranged identical to the second layer, the first, second, third and fourth layers being arranged in consecutive order one on top of the other.

2. The system of claim 1, wherein the payload is so disposed and arranged so as to substantially eliminate sway and rocking of the payload and railcar while in transit.

3. The system of claim 1, wherein the alternating staggered arrangement is such that a first of the rows and a third of the rows are disposed toward the first side of the rail car and a second of the rows and a fourth of the rows are disposed toward the second side of the rail car.

4. A distribution system, comprising:
   a railcar having a length defining an x-direction; and
   a payload disposed within an interior of the railcar;
   wherein the payload comprises a plurality of assemblage of products, each of the assemblage of products being disposed upon a pallet, the assemblages being arranged in rows of assemblages along the x-direction;
   wherein the rows of assemblages are disposed in an alternating, staggered arrangement in the x-direction such that one of the rows of assemblages is disposed substantially closer to a first side of the railcar than to a second side of the railcar, and an adjacent one of the rows of assemblages is disposed substantially closer to the second side of the railcar than the first side of the railcar;
   the railcar has a height defining a z-direction; and
   the rows of assemblages comprise:
      a first set of rows of assemblages disposed at a first end of the railcar;
      a second set of rows of assemblages disposed at a second opposite end of the railcar; and
      a third set of rows of assemblages disposed between the first set of rows of assemblages and the second set of rows of assemblages, wherein the first and second sets of rows of assemblages include product stacked higher in the z-direction as compared to the third set of rows of assemblages.

5. The system of claim 4, wherein the first set of rows of assemblages comprises two adjacent rows of assemblages and the second set of rows of assemblages comprises two adjacent rows of assemblages.

6. The system of claim 4, wherein the first set of rows of assemblages comprises three adjacent rows of assemblages and the second set of rows of assemblages comprises three adjacent rows of assemblages.

7. The system of claim 4, wherein the first set of rows of assemblages and the second set of rows of assemblages each have three layers of assemblages stacked in the z-direction, and the third set of rows of assemblages have two layers of assemblages stacked in the z-direction.

8. The system of claim 1, wherein:
   the railcar has a width defining a y-direction; and
   each row of the rows of assemblages comprises two assemblages in the y-direction.

9. A distribution system, comprising:
   a railcar having a length defining an x-direction; and
   a payload disposed within an interior of the railcar;
   wherein the payload comprises a plurality of assemblage of products, each of the assemblage of products being disposed upon a pallet, the assemblages being arranged in rows of assemblages along the x-direction;
   wherein the rows of assemblages are disposed in an alternating, staggered arrangement in the x-direction such that one of the rows of assemblages is disposed substantially closer to a first side of the railcar than to a second side of the railcar, and an adjacent one of the rows of assemblages is disposed substantially closer to the second side of the railcar than the first side of the railcar,
   wherein each assemblage of products comprises, an assemblage of reams of paper, comprising:
      a plurality of layers of reams of paper comprising a first layer having a first arrangement of reams of paper, a second layer having a second arrangement of reams of paper disposed on top of the first layer, and a third layer having a third arrangement of reams of paper disposed on top of the second layer;
      wherein the second arrangement is different from the first arrangement so as to form interlocking first and second layers;
      wherein the third arrangement is different from the second arrangement, so as to form interlocking second and third layers.

10. A distribution system, comprising:
   a railcar having a length defining an x-direction; and
   a payload disposed within an interior of the railcar;
   wherein the payload comprises a plurality of assemblage of products, each of the assemblage of products being disposed upon a pallet, the assemblages being arranged in rows of assemblages along the x-direction;
   wherein the rows of assemblages are disposed in an alternating, staggered arrangement in the x-direction such that one of the rows of assemblages is disposed substantially closer to a first side of the railcar than to a second side of the railcar, and an adjacent one of the rows of assemblages is disposed substantially closer to the second side of the railcar than the first side of the railcar;
   wherein each assemblage of products comprises:
      a plurality of layers of reams of paper having a common reference frame defined by a plan view of a first layer of the plurality of layers having a lower left corner, an upper left corner, an upper right corner, and a lower right corner:
      the first layer comprising a first group of reams of paper disposed in the lower left corner, a second group of reams of paper disposed in the upper left corner, a third group of reams of paper disposed in the upper right corner, and a fourth group of reams of paper disposed in the lower right corner;
      wherein at least one of the first group, the second group, the third group, and the fourth group has an arrangement of reams of paper different from the other groups with respect to configuration and/or orientation of the respective reams.

11. The system of claim 1, wherein a footprint area of each layer is equal to or greater than 85% of a footprint area of the pallet.

12. The system of claim 1, wherein the second layer is arranged as a mirror image of the first layer.

13. The system of claim 1, wherein each assemblage of products comprises further comprises
   a plurality of corner boards disposed on the pallet.

* * * * *